(12) United States Patent
Vanderwees

(10) Patent No.: US 9,328,968 B2
(45) Date of Patent: May 3, 2016

(54) LOW PROFILE, SPLIT FLOW CHARGE AIR COOLER WITH UNIFORM FLOW EXIT MANIFOLD

(71) Applicant: Dana Canada Corporation, Oakville (CA)

(72) Inventor: Doug Vanderwees, Mississauga (CA)

(73) Assignee: Dana Canada Corporation, Oakville, Ontario (CA)

(*) Notice: Subject to any disclaimer, the term of this patent is extended or adjusted under 35 U.S.C. 154(b) by 580 days.

(21) Appl. No.: 13/661,422

(22) Filed: Oct. 26, 2012

(65) Prior Publication Data

US 2013/0105128 A1    May 2, 2013

Related U.S. Application Data

(60) Provisional application No. 61/552,808, filed on Oct. 28, 2011.

(51) Int. Cl.
 *F28F 9/00* (2006.01)
 *F28D 9/00* (2006.01)
 (Continued)

(52) U.S. Cl.
 CPC ...... *F28D 9/00* (2013.01); *F28D 9/005* (2013.01); *F28D 9/0037* (2013.01);
 (Continued)

(58) Field of Classification Search
 CPC ............ F28F 9/00; F28F 3/025; F28F 3/027; F28F 3/06; F28F 3/08; F28F 3/086; F28F 9/026; F28F 9/0265; F28F 9/0263; F28F 9/0268; F28F 9/0278; F28D 9/0037; F28D 9/005; F28D 9/0056; F28D 9/0043; F28D 9/0068; F28D 9/0075; B60H 1/02; B60H 1/143

USPC .......... 165/164–167, 126, 139, 51, 52, 109.1, 165/153, 158–161, 173–176, 145, 157; 123/41.22, 41.57, 41.79, 528, 563
See application file for complete search history.

(56) References Cited

U.S. PATENT DOCUMENTS

| | | | |
|---|---|---|---|
| 3,424,240 A | 1/1969 | Stein et al. | |
| 3,460,611 A * | 8/1969 | Tramuta et al. | ............... 165/166 |

(Continued)

FOREIGN PATENT DOCUMENTS

| | | |
|---|---|---|
| DE | 102004014669 A1 | 10/2005 |
| EP | 1484567 B1 | 8/2007 |

(Continued)

OTHER PUBLICATIONS

English Machine Translation of DE 10 2004 014 669 A1.
(Continued)

*Primary Examiner* — Jose O Class-Quinones
(74) *Attorney, Agent, or Firm* — Marshall & Melhorn, LLC

(57) ABSTRACT

A low profile, split flow charge air cooler with uniform flow exit manifold comprises a first heat exchanger core having a plurality of gas flow passages and a plurality of coolant flow passages arranged in alternating order. First and second gas outlet manifolds are in communication with the gas flow passages, and a gas inlet manifold is in communication with both the first and second gas outlet manifolds. The gas inlet manifold is located between the first and second gas outlet manifolds, such that the gas flows in two different directions from the inlet manifold toward the outlet manifolds. A gas outlet chamber receives the gas flows from the gas outlet manifolds and provides a space in which the gas flows are combined before being discharged from the heat exchanger.

16 Claims, 21 Drawing Sheets

(51) Int. Cl.
  *F28F 3/02* (2006.01)
  *F28F 3/06* (2006.01)
  *B60H 1/02* (2006.01)
  *B60H 1/14* (2006.01)
  *F28F 3/08* (2006.01)
  *F28F 9/02* (2006.01)
  *F28F 13/12* (2006.01)
  *F28D 21/00* (2006.01)
  *F02B 29/04* (2006.01)

(52) U.S. Cl.
  CPC ........... *F28D 9/0043* (2013.01); *F28D 9/0056* (2013.01); *F28D 9/0068* (2013.01); *F28D 9/0075* (2013.01); *B60H 1/02* (2013.01); *B60H 1/143* (2013.01); *F02B 29/0462* (2013.01); *F28D 2021/0082* (2013.01); *F28F 3/025* (2013.01); *F28F 3/027* (2013.01); *F28F 3/06* (2013.01); *F28F 3/08* (2013.01); *F28F 3/086* (2013.01); *F28F 9/00* (2013.01); *F28F 9/026* (2013.01); *F28F 9/0263* (2013.01); *F28F 9/0265* (2013.01); *F28F 9/0268* (2013.01); *F28F 9/0278* (2013.01); *F28F 13/12* (2013.01); *F28F 2009/029* (2013.01); *F28F 2250/06* (2013.01); *F28F 2280/06* (2013.01); *Y02T 10/146* (2013.01)

(56) References Cited

U.S. PATENT DOCUMENTS

| | | | |
|---|---|---|---|
| 3,960,207 A | | 6/1976 | Boer |
| 4,006,776 A | * | 2/1977 | Pfouts et al. ............... 165/166 |
| 4,073,340 A | | 2/1978 | Parker |
| 5,107,923 A | * | 4/1992 | Sherman et al. ............ 165/159 |
| 5,205,347 A | | 4/1993 | Hughes |
| RE35,890 E | | 9/1998 | So |
| 5,931,219 A | * | 8/1999 | Kull et al. .................... 165/51 |
| 6,170,568 B1 | * | 1/2001 | Valenzuela ........... F28D 9/0012 165/166 |
| 6,273,183 B1 | | 8/2001 | So et al. |
| 6,497,274 B2 | * | 12/2002 | Cheadle ............... F28D 9/0012 123/196 AB |
| 6,948,909 B2 | | 9/2005 | Meshenky et al. |
| 7,096,860 B2 | | 8/2006 | Reuss |
| 7,191,824 B2 | | 3/2007 | Wu et al. |
| 7,703,282 B1 | | 4/2010 | Meissner et al. |
| 8,752,377 B2 | * | 6/2014 | Laube ................. F02B 29/0412 123/563 |
| 2003/0106679 A1 | * | 6/2003 | Brost et al. .................. 165/154 |
| 2004/0177950 A1 | * | 9/2004 | Gluck ........................... 165/166 |
| 2005/0056411 A1 | * | 3/2005 | Dilley et al. .................. 165/167 |
| 2007/0131405 A1 | | 6/2007 | Harada et al. |
| 2008/0087410 A1 | | 4/2008 | Muller-Lufft et al. |
| 2008/0223562 A1 | | 9/2008 | Braic et al. |
| 2009/0260789 A1 | | 10/2009 | Sperandei et al. |

FOREIGN PATENT DOCUMENTS

| | | |
|---|---|---|
| FR | 2859239 B1 | 1/2006 |
| JP | 53-49614 A1 | 5/1978 |
| JP | 10-160380 | 6/1998 |
| WO | 2009124400 A1 | 10/2009 |

OTHER PUBLICATIONS

Patent Abstracts of Japan, English Abstract of JP 53-049614.
Patent Abstracts of Japan, English Abstract of JP 10-160380.
French to English machine translation of Abstract, Specification and claims of FR 2859239 A1.
French to English translation of claims of FR 2859239 B1.

* cited by examiner

LOW PROFILE, SPLIT FLOW CHARGE AIR COOLER WITH UNIFORM FLOW EXIT MANIFOLD

CROSS-REFERENCE TO RELATED APPLICATION

This application claims priority to and the benefit of U.S. Provisional Patent Application No. 61/552,808, filed on Oct. 28, 2011, the contents of which are incorporated herein by reference.

FIELD OF THE INVENTION

The invention generally relates to heat exchangers for cooling a hot gas with a gaseous or liquid coolant, and particularly to gas-gas or gas-liquid heat exchangers having split flow cores, for gas cooling in vehicle engine systems.

BACKGROUND OF THE INVENTION

It is known to use gas-liquid heat exchangers to cool compressed charge air in turbocharged internal combustion engines or in fuel cell engines, or to cool hot engine exhaust gases. Various constructions of gas-cooling heat exchangers are known. For example, it is known to construct gas-cooling heat exchangers comprised of two or more concentric tubes, with the annular spaces between adjacent tubes serving as fluid flow passages. Corrugated fins are typically provided in the flow passages to enhance heat transfer and, in some cases, to join together the tube layers. Gas-cooling heat exchangers can also comprise a core constructed from stacks of tubes or plates which provide alternating flow passages for the hot gas and the coolant.

Each specific application has its own heat exchange requirements and space constraints. The inventors have found that in some constructions it is desirable to split the air flow into two directions at the gas inlet manifold while providing uniform gas flow at the gas outlet manifold. There is a need for effective and efficient constructions of such heat exchangers.

SUMMARY OF THE INVENTION

In an embodiment there is provided a heat exchanger for cooling a gas with a coolant. The heat exchanger comprises a first heat exchanger core comprising a plurality of first gas flow passages and a plurality of first coolant flow passages, wherein the first gas flow passages and the first coolant flow passages are arranged in alternating order throughout the first core. The heat exchanger further comprises a first gas outlet manifold and a second gas outlet manifold, at least one of which is in flow communication with the gas flow passages of the core. The heat exchanger further comprises a gas inlet manifold in flow communication with both the first and second gas outlet manifolds and being located upstream of the first and second gas outlet manifolds. The heat exchanger further comprises a gas outlet chamber in flow communication with both the first and second gas outlet manifolds and being located downstream of the first and second gas outlet manifolds. The heat exchanger further comprises a gas outlet for discharging the gas from the heat exchanger. The gas inlet manifold is located between the first gas outlet manifold and the second gas outlet manifold, such that a first gas flow direction between the gas inlet manifold and the first gas outlet manifold differs from a second gas flow direction between the gas inlet manifold and the second gas outlet manifold; and the gas outlet chamber receives the gas flows from the first and second gas outlet manifolds and provides a space in which the gas flows from the first and second gas outlet manifolds are combined before being discharged from the heat exchanger.

In an embodiment, the first gas flow direction is at an angle of about 180 degrees relative to the second gas flow direction.

In an embodiment, the gas inlet manifold is in flow communication with all of the gas flow passages of the first core.

In an embodiment, the inlet manifold and the first and second gas outlet manifolds are contained within the first core, such that the first core is self-enclosed.

In an embodiment, each of the gas flow passages in the first core is in flow communication with the gas inlet manifold and with both the first and second gas outlet manifolds.

In an embodiment, each of the first and second gas outlet manifolds is in flow communication with each of the gas flow passages in the first core.

In an embodiment, the heat exchanger further comprises a second heat exchanger core comprising a plurality of second gas flow passages and a plurality of second coolant flow passages, wherein the second gas flow passages and the second coolant flow passages are arranged in alternating order throughout the second core. According to this embodiment, the gas inlet manifold may be in flow communication with each of the first gas flow passages of the first core and each of the second gas flow passages of the second core. Also in this embodiment, the first gas outlet manifold may be in flow communication with each of the first gas flow passages of the first core and the second gas outlet manifold is in flow communication with each of the second gas flow passages of the second core.

In an embodiment, the first and second gas outlet manifolds are located at opposite sides of the first core.

In an embodiment, the first core has a central longitudinal axis; and wherein the gas inlet manifold extends along said axis; wherein each of the first gas outlet manifold and the second gas outlet manifold are spaced away from said axis toward a generally axially-extending side of the first core; and wherein the first and second gas outlet manifolds extend along the generally axially-extending side of the first core.

In an embodiment, the first core has a top through which the gas enters the air inlet manifold and an opposite bottom through which the gas exits the first and second gas outlet manifolds; wherein the top and the bottom of the first core are parallel to the gas flow passages; and wherein the gas outlet chamber is located along the bottom of the first core. In this embodiment, a plate with a plurality of perforations may be provided across the gas outlet. The perforations of the plate may be larger at a center of the gas outlet than at an outer edge of the gas outlet.

In an embodiment, the heat exchanger further comprises a base plate for connection to a component which receives the gas from the heat exchanger.

In an embodiment, one or more of the gas flow passages and/or one or more of the coolant flow passages are provided with a turbulence-enhancing insert in the form of a fin or a turbulizer comprising a plurality of corrugations.

In an embodiment, the corrugations of each insert within one or more of the gas flow passages extend along the second gas flow direction between the gas inlet manifold and each of the gas outlet manifolds; wherein the corrugations of said insert are interrupted in the vicinity of said gas inlet manifold so that the gas inlet manifold is left uncovered by said insert; and wherein gaps are provided between opposite ends of said gas inlet manifold and a peripheral edge of said gas flow passage, and wherein said insert includes at least one continuous corrugation extending continuously through each of said gaps, and said at least one continuous corrugation extends between the first gas outlet manifold and the second gas outlet manifold. In this embodiment the corrugations include side walls, and the side walls of the continuous corrugations are substantially unperforated, at least in those portions of the continuous corrugations passing through said gaps.

In an embodiment, gaps are provided between opposite ends of said gas inlet manifold and a peripheral edge of said gas flow passage, and wherein a bypass channel is defined along the outer peripheral edge of the gas flow passage, said channel being in flow communication with the first and second gas outlet manifolds; and wherein the heat exchanger further comprises a blocking element provided in each of the gaps between one of the ends of the gas inlet manifold and the bypass channel, the blocking element extending along an edge of the gas inlet manifold and blocking bypass flow between the gas inlet manifold and the bypass channel.

In an embodiment, the coolant flow passages are configured for flow of the coolant along a U-shaped flow path, and the heat exchanger core includes a coolant inlet manifold and a coolant outlet manifold which are both located along one side of the heat exchanger core; and wherein at least one elongate rib is located between the coolant inlet manifold and the coolant outlet manifold, extending along a direction of coolant flow to guide the flow of coolant along a U-shaped, so as to guide the flow of said coolant along said U-shaped flow path.

BRIEF DESCRIPTION OF THE DRAWINGS

The invention will now be described, by way of example only, with reference to the accompanying drawings, in which.

DETAILED DESCRIPTION

Figure 1:
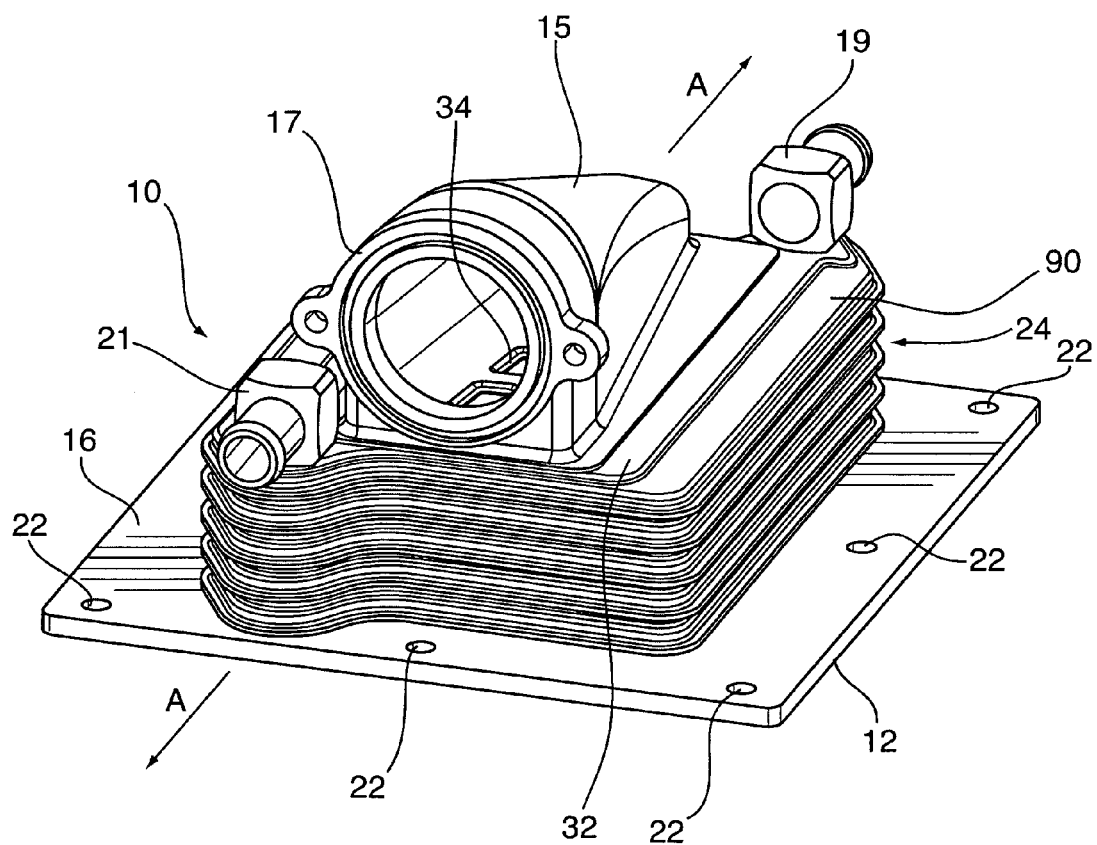
FIG. 1 is a top perspective view of a heat exchanger according to a first embodiment.

A heat exchanger 10 according to a first embodiment is now described below with reference to FIGS. 1 to 14.

Heat exchanger 10 according to the first embodiment may be used as a charge air cooler in a motor vehicle. Accordingly, the heat exchanger 10 includes inlets, outlets and flow passages for air and for a gaseous or liquid coolant, more typically a liquid coolant. The inlets and outlets for the air and the coolant are arranged such that the air enters the top of heat exchanger and exits the bottom, while the coolant enters and exits through the top of the heat exchanger. The heat exchanger 10 has a base plate 12 which is adapted for mounting to another component of a vehicle air intake system, such as an intake manifold or a humidifier. Heat exchanger 10 also includes an air inlet duct 15 for receiving hot, pressurized charge air from an upstream intake system component (not shown). The duct 15 is connected to the upstream component through an attachment flange 17. The inlet duct 15 may have tapered sidewalls so as to optimize the distribution of air into the core of heat exchanger 10, as will be further discussed below. Heat exchanger 10 also has a coolant fittings 19, 21, one being located at the coolant inlet manifold and the other at the coolant outlet manifold. The specific locations and configurations of inlet and outlet openings for the air and the coolant are dependent upon the specific configuration of a vehicle's air intake system, and will vary from one application to another.

The base plate 12 includes a central opening which acts as the outlet for air which is cooled in heat exchanger 10. The base plate has a top surface 16 to which the core 24 of the heat exchanger is mounted, and an opposite bottom surface 18 which is adapted for mounting to another vehicle component which receives the cooled air from heat exchanger 10. The bottom surface may be provided with a groove 20 which may receive an O-ring for sealing the heat exchanger 10 to the adjacent component.

As shown, the outer edges of the base plate 12 extend outwardly beyond the core 24 so as to form a peripheral flange which may be provided with holes 22 for attachment to the adjacent component by bolts or the like (not shown).

The core 24 is mounted on the top surface 16 of base plate 12 and is self-enclosed, meaning that the manifolds and flow passages are completely enclosed within the stack of plates from which the core 24 is formed, and therefore heat exchanger 10 does not require an external housing. The core is configured to split the flow of air after it enters the core 24, and to improve uniformity of the air flow as it leaves the heat exchanger 10.

The core 24 is made up of a plurality of plates which are joined together face-to-face in order to form alternating flow passages for air and coolant. Core 24 includes a plurality of first core plates 26 and a plurality of second core plates 28 which, in the present embodiment, are mirror images of one another, but which may be identical in other embodiments of the invention. The core 24 further comprises a bottom plate 30 located at the bottom of core 24, immediately adjacent to the base plate 12, and a top plate 32 located at the top of core 24. Although not shown in the drawings, the top plate 32 will be provided with an air inlet fitting through which air is supplied to heat exchanger 10, as well as inlet and outlet fittings for the coolant. Although the core 24 of heat exchanger 10 is self-enclosed and is made up of core plates 26, 28 joined together face-to-face, it will be appreciated that the heat exchanger 10 may instead be made up of a stack of dished plates, having nesting upstanding edges. Alternatively, the core 24 does not need to be self-enclosed, but may rather be enclosed within a housing, as in the third embodiment described further below and shown in FIGS. 16-18.

The heat exchanger 10 includes an air inlet manifold 34 which, in the illustrated embodiment, is centrally located along a central longitudinal axis A of heat exchanger 10 (axis A is also used below as the central longitudinal axis of the individual plates), and is defined by a plurality of discrete openings 86 which are spaced apart along axis A. The top of air inlet manifold 34 is open through openings 86 in top plate 32, and the bottom of manifold 34 is closed by bottom plate 30. It will be appreciated that the precise location, shape and appearance of the inlet manifold 34 may vary from that shown in the drawings. For example, air inlet manifold 34 may comprise a single, elongate opening in core 24, and the openings comprising manifold 34 are not necessarily aligned with axis A. Although openings 86 are all shown as being the same size, this is not necessarily the case. The relative sizes of the openings 86 may be adjusted as needed in order to achieve a uniform distribution of intake air along the length of the air intake manifold 34, and a uniform air flow distribution throughout core 24. For example, the openings 86 proximate to the attachment flange 17 may be larger than the openings distal from the attachment flange 17. By using the openings 86 to balance the air flow distribution throughout the core 24, the heat exchanger 10 does not rely solely on the shape of the air inlet duct 15 for flow balancing. Thus, the exact shape of the inlet duct 15 becomes less critical, and the dominant consideration becomes packaging constraints rather than flow balancing. Since the overall shape and volume of the heat exchanger 10 is partially determined by the configuration of the inlet duct 15, this is an important advantage of heat exchanger 10 in vehicular applications where space is limited.

Figure 5:
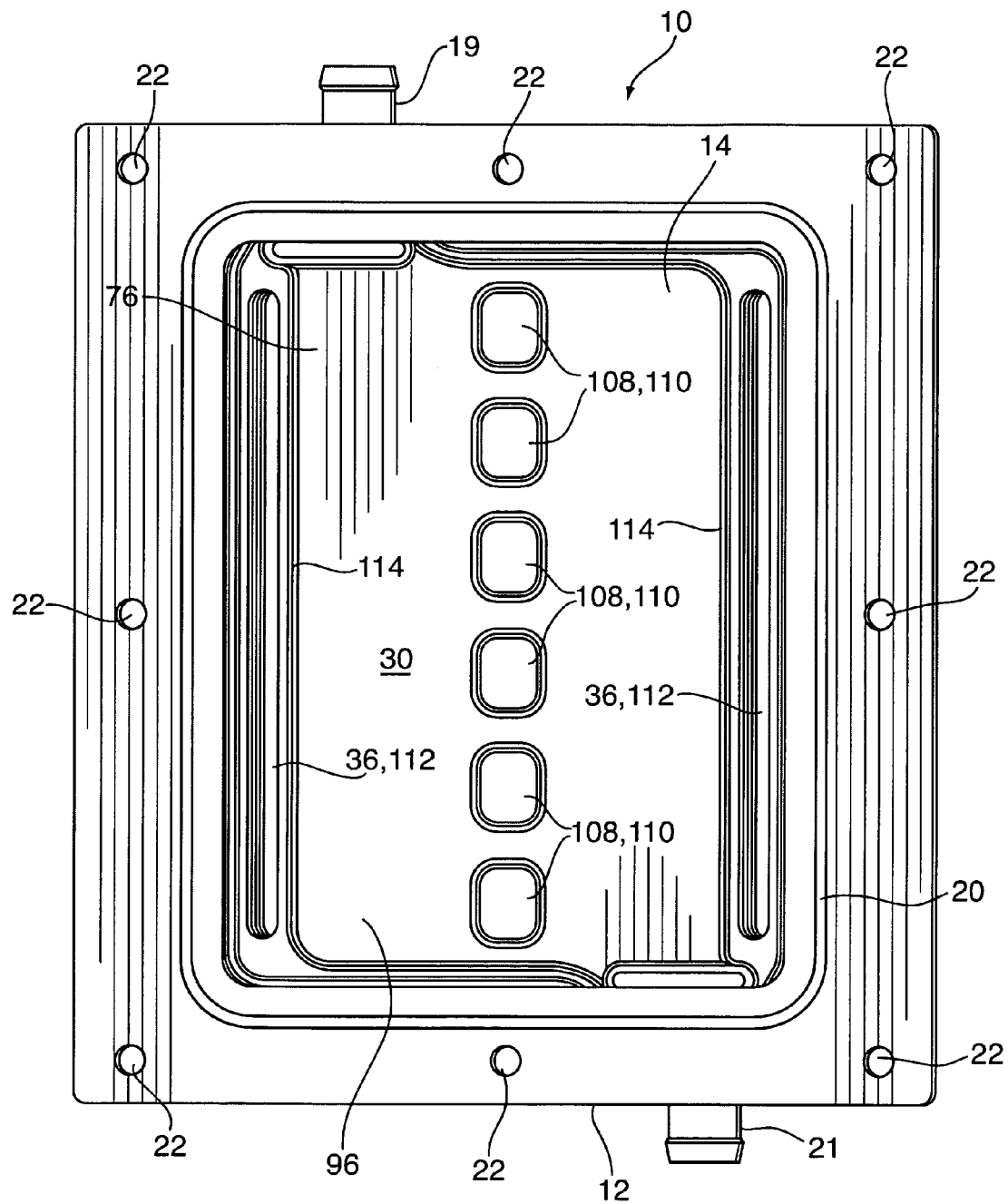
FIG. 5 is a bottom view thereof, with the perforated plate removed.
Figure 6:
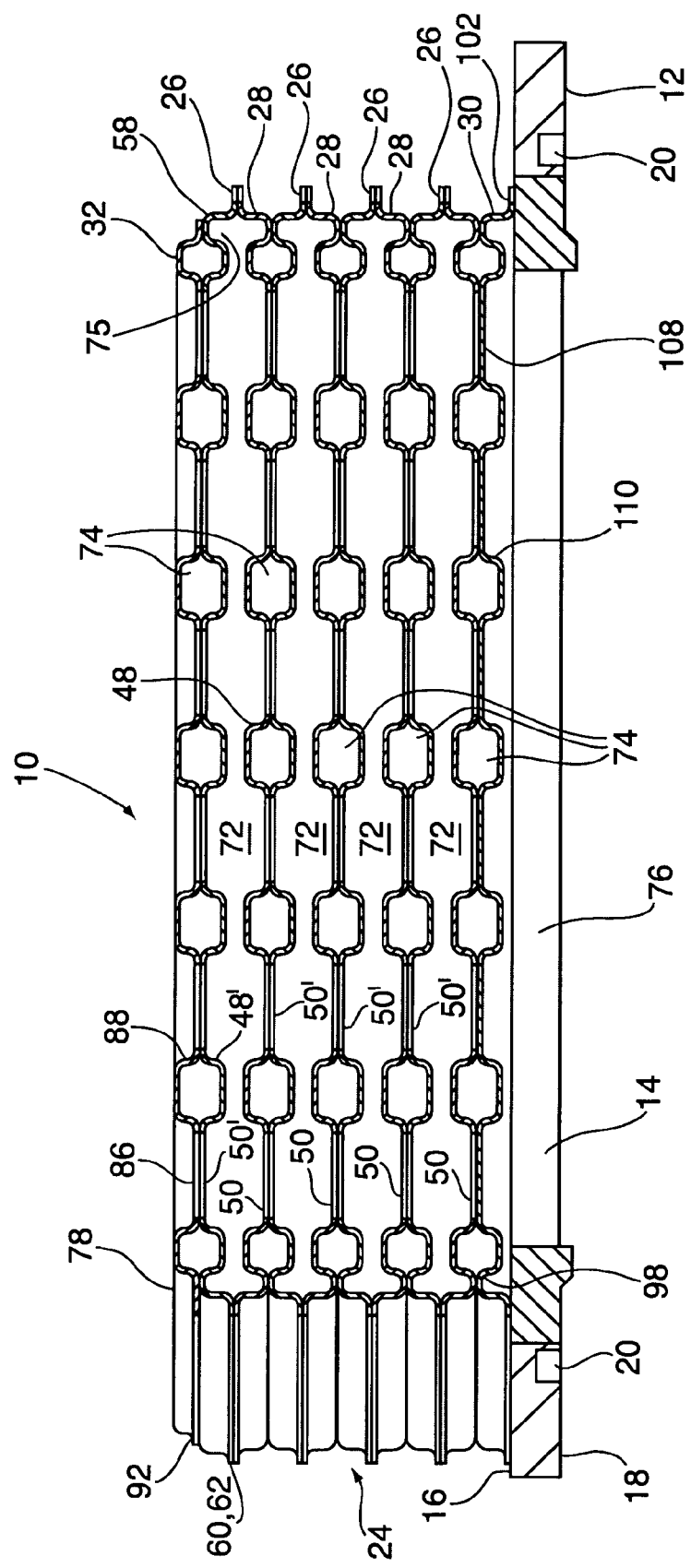
FIG. 6 is a longitudinal cross-section along line 6-6 of FIG. 4, omitting the gas inlet duct and coolant fittings.
Figure 7:
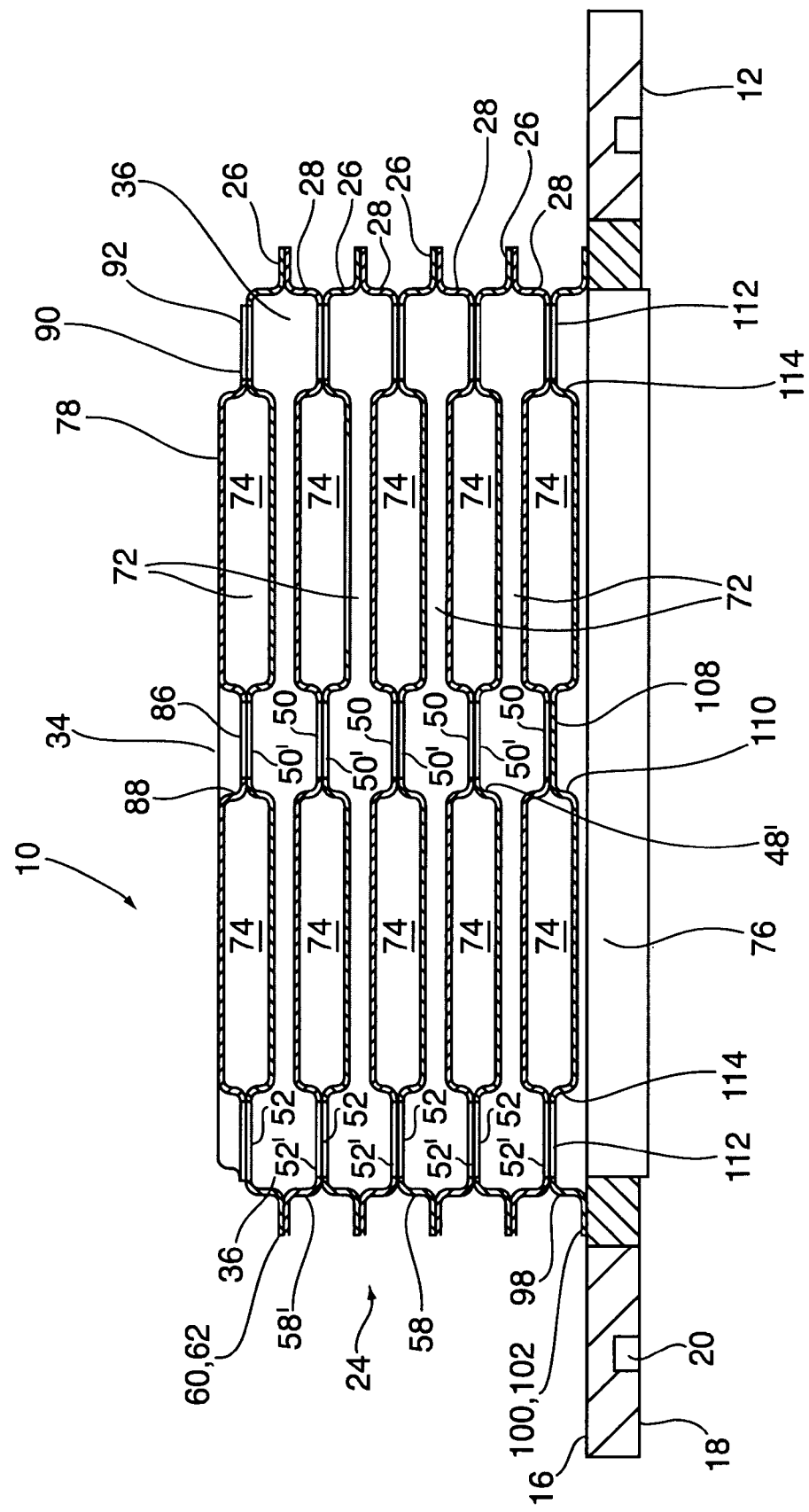
FIG. 7 is a transverse cross-section along line 7-7 of FIG. 4, omitting the gas inlet duct and coolant fittings.

Visible in the bottom view of FIG. 5 are a pair of air outlet manifolds 36, the bottoms of which are open through openings 112 of bottom plate 30, and the tops of which are closed by top plate 32. The air outlet manifolds 36 are in flow communication with the central opening 14 of base plate 12, through which the air exits heat exchanger 10. The air outlet manifolds 36 each extend longitudinally, parallel to the air inlet manifold 34 and axis A, and extend along a greater part of the length of core 24. The inlet and outlet manifolds 34, 36 are in flow communication with air flow passages 72 throughout core 24, and it can be seen that the air entering the air inlet manifold 34 at the top of heat exchanger 10 is split into two directions, flowing transversely through air flow passages 72 away from the manifold 34 toward the air outlet manifolds 36 located close to the outer peripheral edges of the core 24. The air then exits through the air outlet manifolds 36 at the bottom of core 24 and flows out of heat exchanger 10 through the central opening 14 of base plate 12. It will be appreciated that heat exchanger 10 has a relatively low profile (height) as compared to its overall footprint (area), and the core is made up of a total of four plate pairs (face-to-face combinations of plates 26, 28), plus the bottom plate 30 and top plate 32. Again, in vehicle applications where space is limited, it may be necessary to limit the height of the heat exchanger 10 to satisfy packaging constraints. In this configuration, where the plates have a relatively large surface area, the inventors have discovered that it is beneficial to split the gas flow in opposing directions in order to provide effective heat exchange throughout the horizontal gas flow paths while avoiding excessive pressure drop. A particular advantage of the split and turned gas flows as they recombine in the exit plenum in this configuration, is that a well-mixed and uniform temperature exit gas stream is achieved, which has system benefits as explained further below; moreover, this well mixed and uniform temperature exit gas stream is achieved within a low profile overall height heat exchanger and exit plenum structure.

Heat exchanger 10 also includes a coolant inlet manifold 38 and a coolant outlet manifold 40 located at opposite longitudinally spaced ends of the core 24. Both the coolant inlet and outlet manifolds 38, 40 are open through the top of heat exchanger 10, and are closed at the bottom of core 24 by bottom plate 30. The coolant inlet and outlet manifolds 38, 40 are in flow communication with a plurality of coolant flow passages 74 defined between adjacent core plates 26, 28 throughout core 24. It can be seen from the drawings that the coolant enters through the top of heat exchanger 10, flowing into the coolant inlet manifold 38, and then flowing diagonally through the core 24 in a generally longitudinal direction to coolant outlet manifold 40, from which the coolant flows out through the top of heat exchanger 10. Thus, it can be seen that the air flow passages 72 and coolant flow passages 74 are arranged such that the air flow and coolant flow are substantially perpendicular to one another, i.e. in a cross-flow arrangement.

It will be appreciated that the locations of the coolant inlet and outlet manifolds are not necessarily as shown in the drawings, nor is the heat exchanger 10 necessarily a cross-flow heat exchanger. Rather, the locations of the coolant manifolds 38, 40 may be located directly across from one another. Where the location of the coolant manifolds results in a core plate which is symmetrical, it will be appreciated that core plates 26, 28 may be identical to one another, in which case the core 24 may be constructed from a stack of identical core plates, excepting of course the top and bottom plates which will be different. It will also be appreciated that the coolant manifolds 38, 40 can be located along the axially extending sides (i.e. the long sides) of the plates, so that the heat exchanger 10 will be a combination co-flow/counter-flow heat exchanger. Also, the coolant manifolds 38, 40 can both be located along the same side or end, in which case the coolant flow passage 74 can have a U-flow configuration. Also, the direction of coolant flow may be reversed from that shown in the drawings, such that the locations of coolant manifolds 38, 40 are reversed.

As can be seen from the drawings, the base plate 12 has a thickness which is significantly greater than the thicknesses of the core plates. The greater thickness of base plate 12 causes the core 24 of heat exchanger 10 to be spaced away from the bottom surface 18 of base plate 12, thereby providing an exit plenum, outlet chamber or outlet air distribution space 76 between the bottom of core 24 and the bottom surface 18 of base plate 12. Within this air distribution space 76 the flow of air exiting core 24 through the split air outlet manifolds 36 may be re-combined and mixed to achieve a uniform temperature and distribute the air flow over the entire area of central opening 14 so as to provide a uniform air flow to the adjacent component of the vehicle intake system. Also, since the air is re-combined within the split air outlet manifolds 36 and in the air distribution space, the air will be at a uniform temperature as it flows through space 76 and exits the bottom of heat exchanger 10. This can be of particular importance, depending on the structure of the component located immediately downstream of heat exchanger 10. For example, in fuel cell engines where a membrane humidifier (not shown) receives the cooled air from heat exchanger 10, non-uniformity of the air temperature can result in hot spots on the face of the humidifier core which receives the air flow from heat exchanger 10. Uneven temperatures may cause localized decreases in humidifier efficiency, or cause dry-out or thermal degradation of the humidifier membranes, or thermal damage to structural humidifier core components, for example where the humidifier is constructed from plastic core plates.

Figure 2:
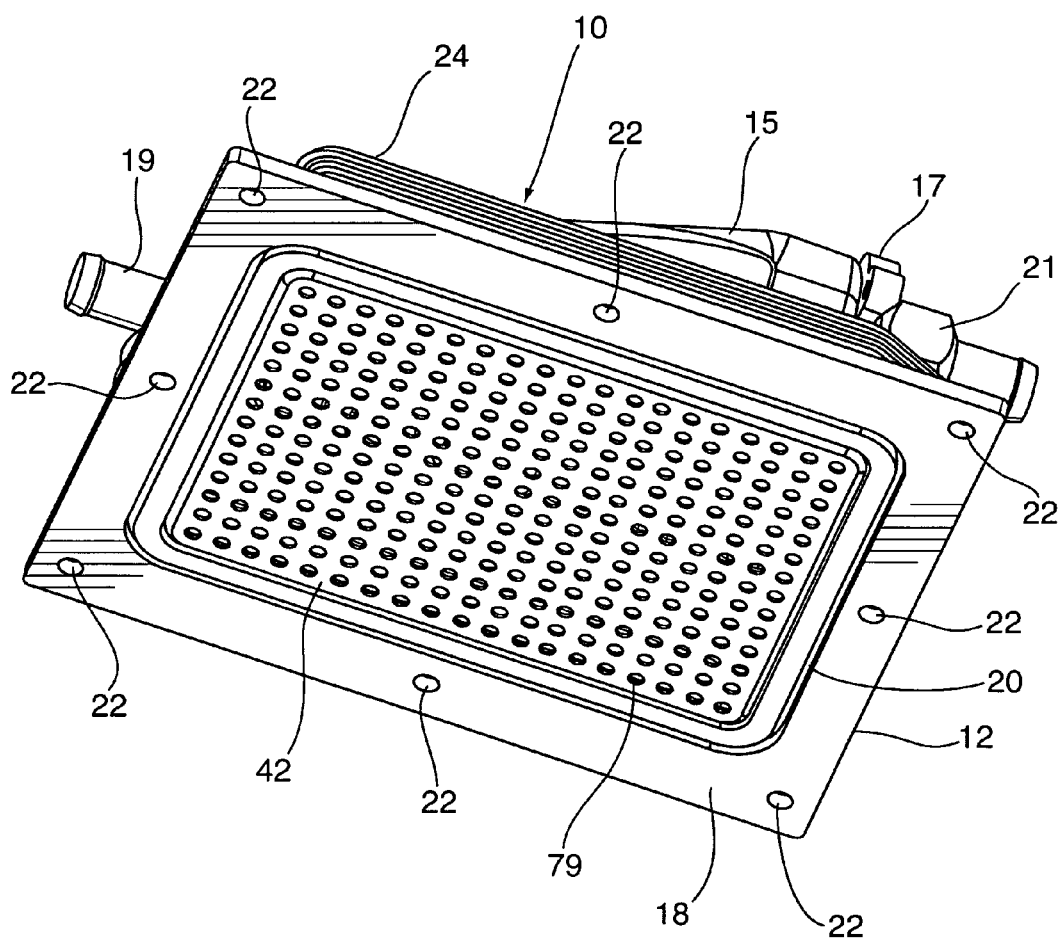
FIG. 2 is a bottom perspective view thereof.
Figure 3:
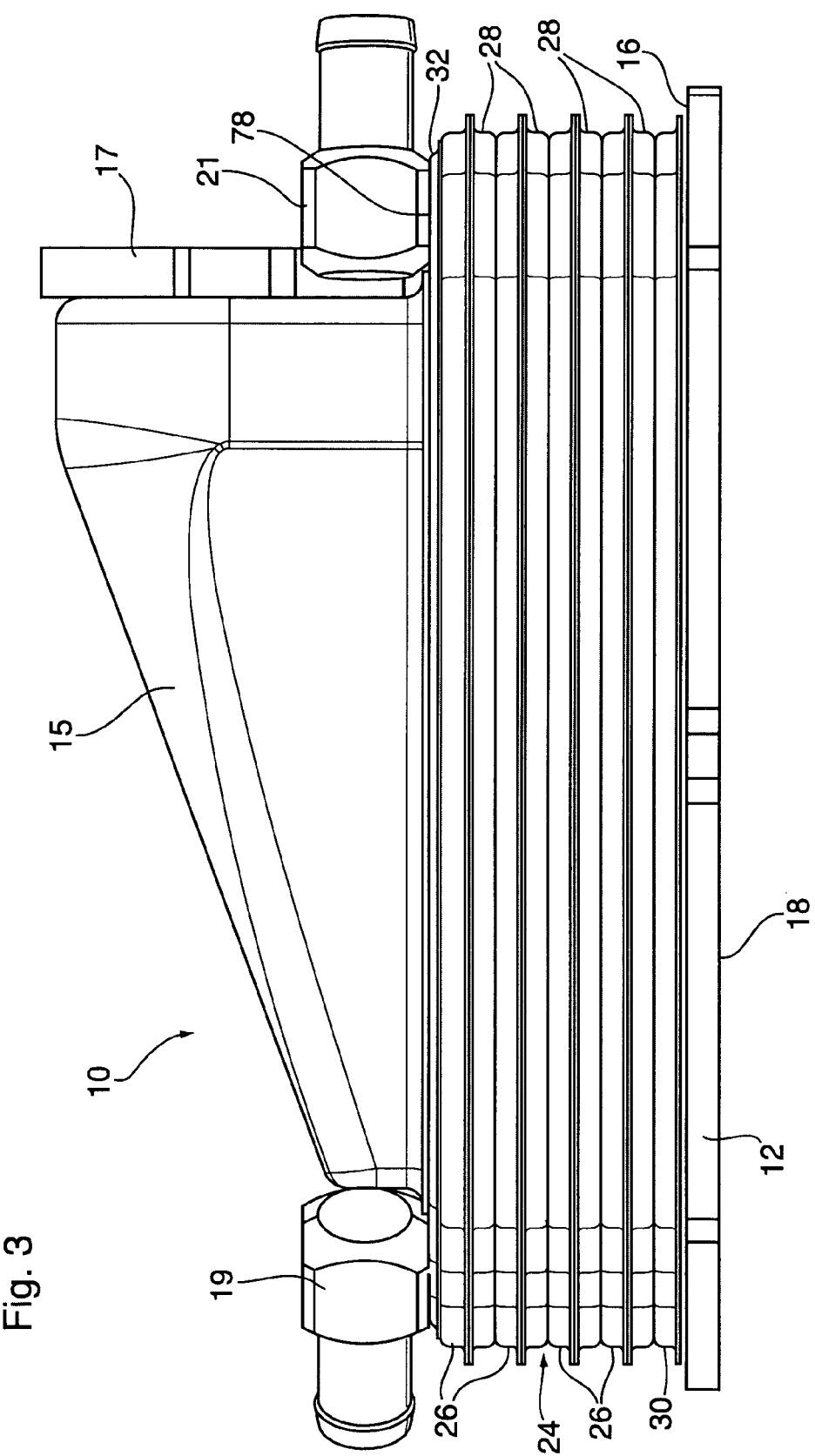
FIG. 3 is side elevation view thereof.
Figure 4:
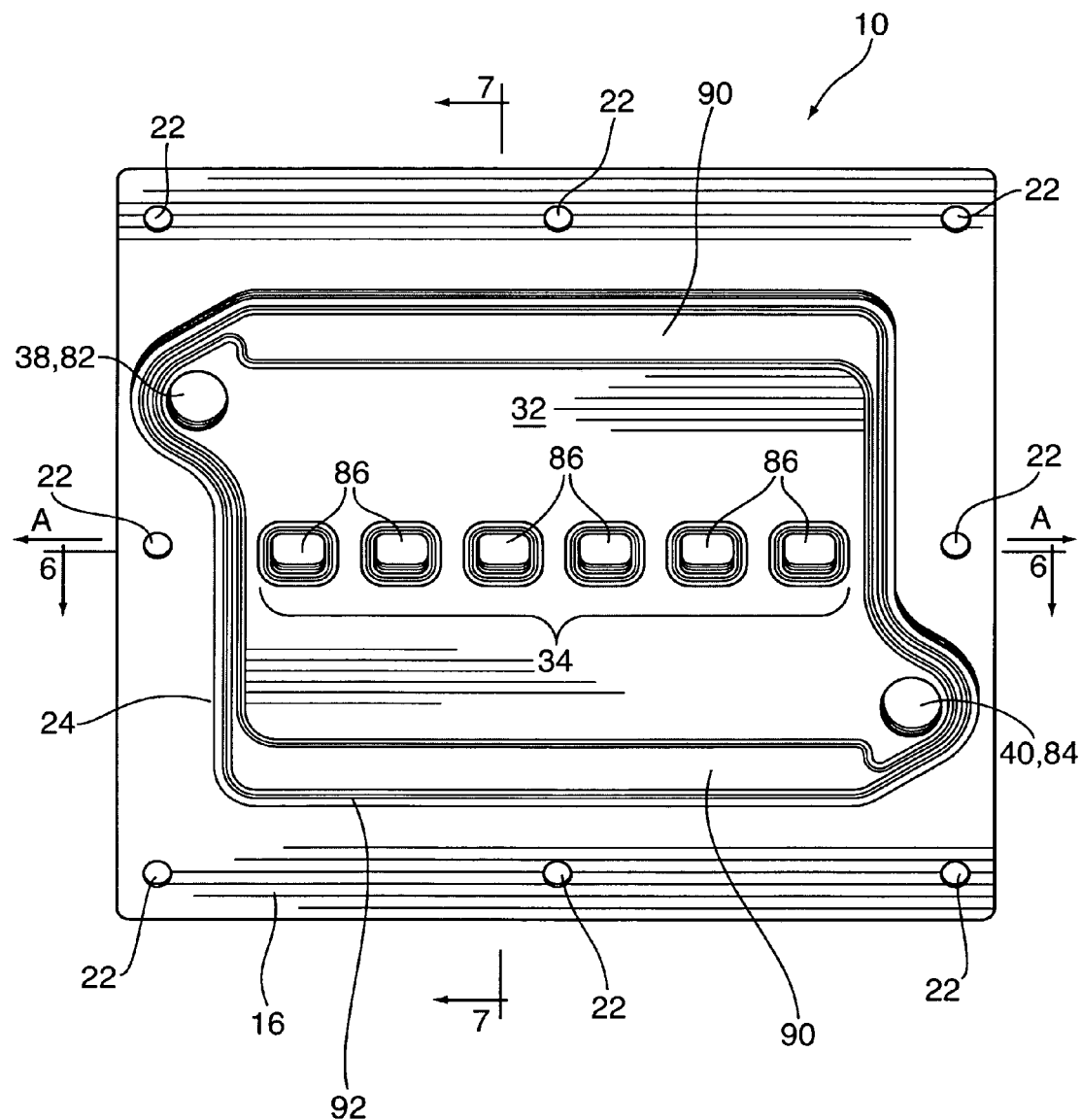
FIG. 4 is a top view thereof, with the gas inlet duct and coolant fittings removed.

It is also desirable that the flow of air exiting the heat exchanger is uniform across central opening 14. Although gas mixing and recombination of the exit gas streams achieved in the present invention is a particular advantage, in some cases uniformity of the exit air flow may be improved by providing an air distribution plate 42 (FIG. 2) having perforations 79 therein for receiving the split flow from manifolds 36 and transforming it into a relatively uniform flow as the air exits heat exchanger 10. For example, the air distribution plate 42 may be interposed between the base plate 12 and the adjacent vehicle component, or the plate 42 may be integrally formed with base plate 12. Although perforations 79 are shown in FIG. 2 as being of uniform size, the perforations 79 may be larger in the middle portion plate 42 and smaller at the edges in order to promote increased re-distribution of flow toward the middle of opening 42, thereby improving the uniformity of the outlet air flow. The provision of a perforated air distribution plate 42 is optional, and may not be needed in all embodiments of the invention. For example, where the back pressure of downstream components is sufficiently high, a uniform outlet air flow can be achieved in the absence of air distribution plate 42.

The following is a description of the core plates 26, 28, which are stacked upon one another in face-to-face arrangement and which, together with bottom and top plates 30, 32, define the core 24.

Figure 8:
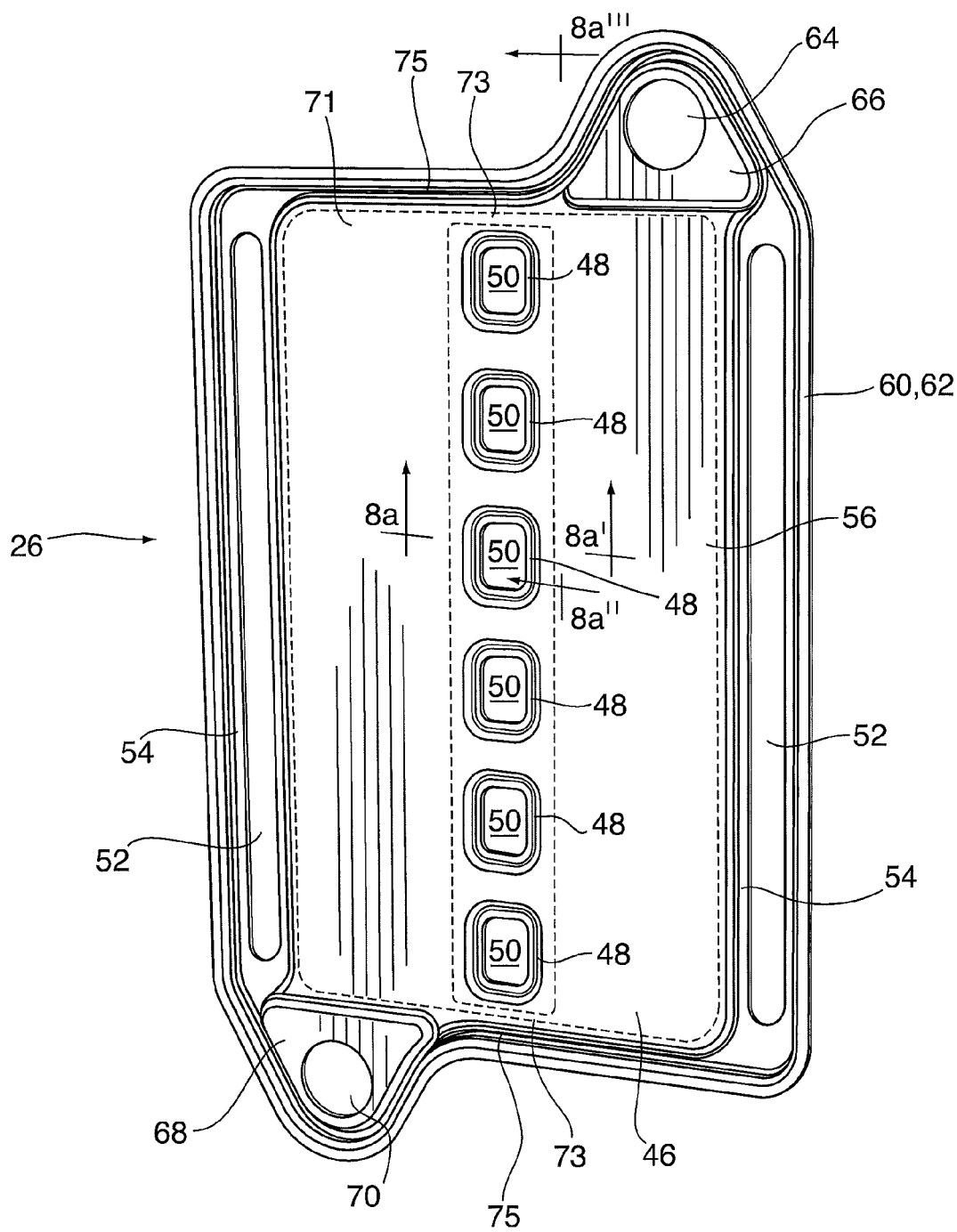
FIG. 8 is a perspective view of the air side of the first core plate.
Figure 9:
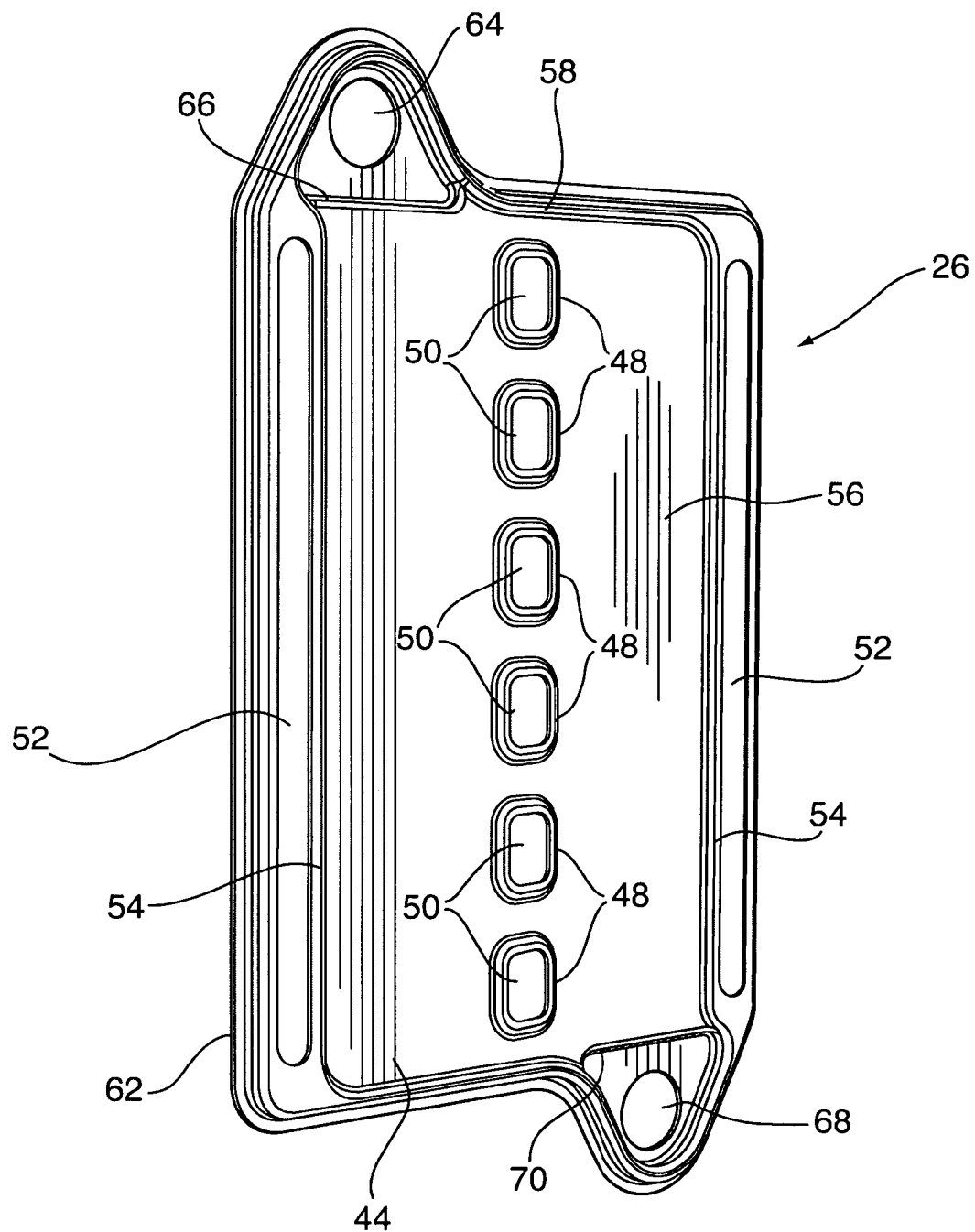
FIG. 9 is a perspective view of the coolant side of the first core plate.

FIGS. 8 to 9 illustrate the respective air side 46 and coolant side 44 of first core plate 26. The coolant flows across the coolant side 44 of core plate 26 while the air flows across the opposite, air side 46 of core plate 26.

First core plate 26 is provided with a plurality of bubbles or bosses 48 upstanding from the coolant side 44 of plate 26. The bosses 48 are located along central longitudinal axis A, and each boss 48 has a flat top surface provided with an air inlet manifold opening 50. A portion of the flat top surface of each boss 48 surrounds the opening 50, providing a sealing surface along which the boss 48 may be sealed to a boss of an adjacent plate, as further discussed below. Transversely spaced toward the peripheral edges of plate 26 and extending along axis A are bosses 54, each of which has a flat top surface provided with an air outlet manifold opening 52. The flat top surfaces of bosses 48 and 54 are co-planar with a coolant side sealing surface 58 in the form of a peripheral ridge or rib, and it is along these surfaces that the core plate 26 is sealed to an adjacent core plate, as further discussed below.

The first core plate 26 includes a planar base 56 along which coolant flows between a coolant inlet manifold opening 64 and a coolant outlet manifold opening 68. As can be seen on the air side 46 of core plate 26, the coolant inlet and outlet manifold openings 64, 68 are formed in the flat top surfaces of bosses 66, 70 upstanding on the air side 46 of core plate 26. On the air side 46 a sealing surface 60 is provided, the sealing surface 60 being provided on an outwardly extending peripheral flange 62, and being co-planar with the flat top surfaces of bosses 66, 70.

In the present embodiment, the first and second core plates 26, 28 are mirror images of one another in a plane which is parallel to axis A. Thus, the above description of the elements of the first core plate 26 applies equally to the description of the second core plate 28, and like elements of core plate 28 are identified by like reference numerals, with the elements of the second core plate 28 being identified by primed reference numerals in order to distinguish them from the elements of the first core plate 26.

As can be seen from the drawings, the first and second core plates 26, 28 are stacked in alternating order throughout the height of core 24, and are sealed together along their respective sealing surfaces. In particular, the core plates 26, 28 are arranged in core 24 such that the coolant side 44 of a first core plate 26 faces the coolant side 44' of an adjacent second core plate 28, such that a coolant flow passage 74 is formed therebetween, and such that the bosses 48 surrounding the air inlet manifold openings 50 of the first core plate 26 seal together with the bosses 48' surrounding the air inlet manifold openings 50' of the adjacent second core plate 28; the bosses 54 surrounding the air manifold outlet openings 52 of first core plate 26 are sealed with the bosses 54' surrounding the air outlet manifold openings 52' of the adjacent second core plate 28; and the coolant side sealing surface 58 of first core plate 26 is sealed to the coolant side sealing surface 58' of adjacent second core plate 28. Thus, the coolant flow passage 74 is defined between the planar base 56 of the first core plate 26 and the planar base 56' of the adjacent second core plate 28, and the coolant flow passage 74 is in flow communication with the aligned coolant inlet manifold openings 64, 64' of core plates 26, 28 and the aligned coolant outlet manifold openings 68, 68' of first and second core plates 26, 28.

The opposite, air side 46 of the first core plate 26 described above is joined face-to-face against the air side 46' of another adjacent second core plate 28, such that an air flow passage 72 is formed between the planar base 56 of the first core plate 26 and the planar base 56' of the second core plate 28. The bosses 66, 70 surrounding the respective coolant inlet and outlet manifold openings 64, 68 of the first core plate 26 are sealed with the bosses 66', 70' surrounding the respective coolant inlet and outlet manifold openings 64', 68' of the adjacent second core plate 28, so as to seal the coolant inlet and outlet manifolds 38, 40 from the air flow passage 72. Also, the air side sealing surface 60 provided on flange 62 of core plate 26 is sealed to a corresponding air side sealing surface 60' on flange 62' of adjacent second core plate 28, thereby sealing the periphery of the air flow passage 72.

The first and second core plates 26, 28 are arranged in alternating order throughout the core 24 as described above, such that each air flow passage 72 is sandwiched between a pair of coolant flow passages 74. In the heat exchanger 10 according to the first embodiment, an uppermost coolant flow passage 74 is provided between the top plate 32 and the coolant side 44 of an adjacent first core plate 26, while a lowermost coolant flow passage 74 is provided between the top side 94 of bottom plate 30 and the coolant side 44 of a second core plate 28.

The top plate 32 has a top side 78 which faces upwardly away from core 24, and a bottom (coolant) side 80 which is sealed to the coolant side 44 of the adjacent first core plate 26 so as to form the uppermost coolant flow passage 74. The top plate 32 includes a coolant inlet manifold opening 82 and a coolant outlet manifold opening 84 so as to permit entry of the coolant into the coolant inlet manifold 38, and to allow coolant to flow out of the coolant outlet manifold 40. Although not shown, it will be appreciated that coolant inlet and outlet fittings will be sealed to the coolant inlet and outlet manifold openings 82, 84 of top plate 32.

In order to permit entry of air into the heat exchanger 10, the top plate 32 is provided with air inlet manifold openings 86 aligned along axis A of top plate 32. The openings 86 are located and sized so as to align with the aligned air inlet manifold openings 50, 50' of core plates 26, 28 throughout core 24. The air inlet manifold openings 86 are formed in the flat top surfaces of bosses 88 upstanding from the coolant side 80 of top plate 32. The top surfaces of bosses 88 are co-planar with a sealing flange 92 extending about the periphery of top plate 32, such that the bosses 88 of top plate 32 are sealed to the bosses 48 surrounding the air manifold inlet openings 50 of the adjacent first core plate 26.

Figure 13:
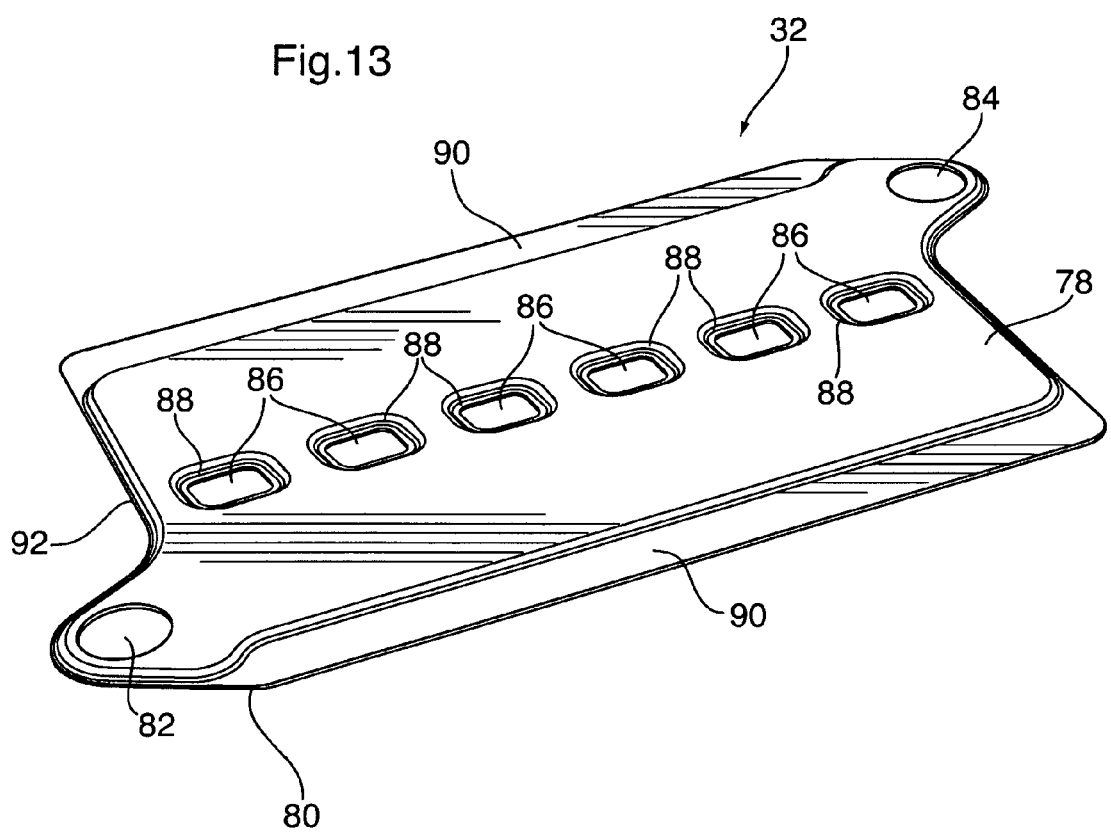
FIG. 13 is a top perspective view of a top plate of the heat exchanger according to the first embodiment.
Figure 14:
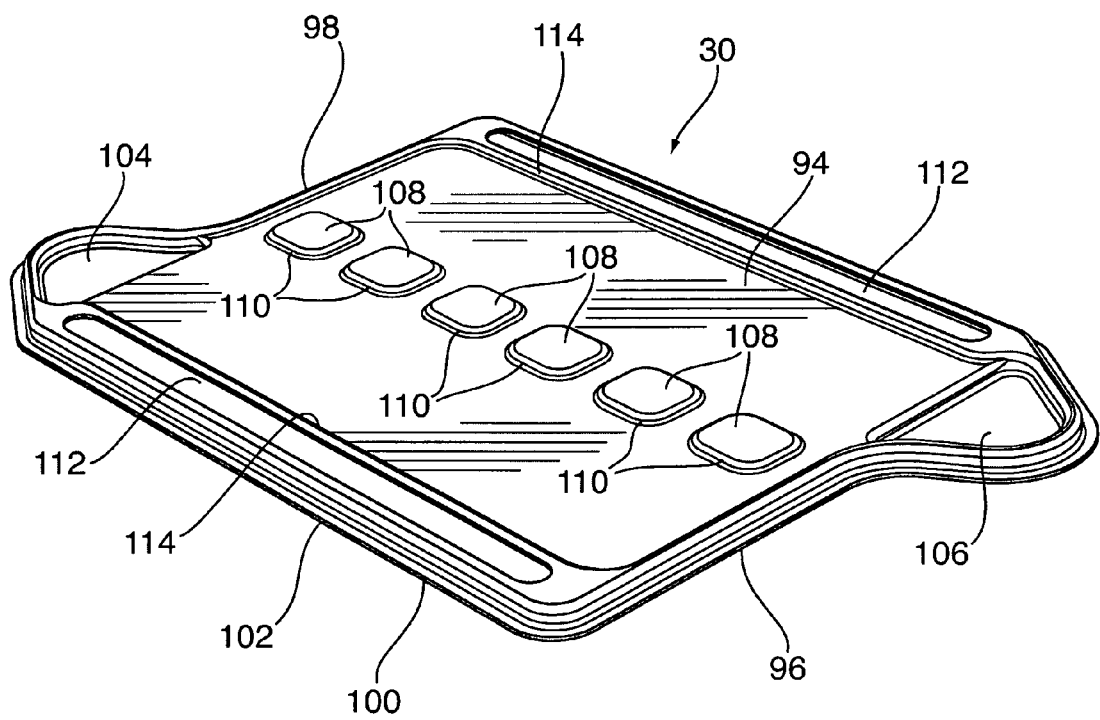
FIG. 14 is a top perspective view of a bottom plate of the heat exchanger according to the first embodiment.

As shown in FIG. 13, the peripheral sealing flange 92 of top plate 32 is wider along the axially extending edges of top plate 32 so as to form a pair of air outlet manifold sealing surfaces 90. The sealing surfaces 90 are sealed to the bosses 54 surrounding the air manifold outlet openings 52 on the coolant side 44 of the adjacent first core plate 26, completely sealing the tops of the air outlet manifolds 36.

The bottom plate 30 has a top (coolant) side 94 and a bottom side 96 which seals against the top surface 16 of base plate 12. On the coolant side 94 of bottom plate 30, there is provided a coolant side sealing surface 98 in the form of an outer peripheral ridge which is sealed to the coolant side sealing surface 58' on the coolant side 44' of a second core plate 28. Accordingly, a lowermost coolant flow passage 74 is formed between the planar base of the bottom plate 30 and the planar base 56' of the adjacent second core plate 28. The bottom side 96 of bottom plate 30 is provided with a sealing surface 100 in the form of an outwardly extending flange 102 around the periphery of the bottom plate 30, along which the bottom plate 30 is sealed to the base plate 12.

One end of bottom plate 30 is provided with a coolant inlet manifold sealing surface 104 and the other end is provided with a coolant outlet manifold sealing surface 106. The sealing surfaces 104 and 106 close the bottoms of the respective coolant inlet manifold 38 and the coolant outlet manifold 40. These sealing surfaces 104, 106 are located at the outer peripheral edges of the bottom plate 30 and are partially surrounded by the coolant side sealing surface 98. However, each of the sealing surfaces 104, 106 is left open on one side so as to provide flow communication between the lowermost coolant flow passage 74 and the coolant inlet and outlet manifolds 38, 40.

The bottom plate 30 is further provided with a row of bosses 110 upstanding on the coolant side 94 and having flat top surfaces 108 which are free of perforations and which are co-planar with the coolant side sealing surface 98. The flat top surfaces 108 of bosses 110 seal against the flat top surfaces of bosses 48' of the adjacent second core plate 28, thereby providing a closed bottom for the air inlet manifold 34.

Lastly, the bottom plate 30 is provided with a pair of air outlet manifold openings 112 provided on the flat top surfaces of bosses 114, which are upstanding on the coolant side 94 of plate 30 and which are co-planar with, and partly defined by, the coolant side sealing surface 98. These air outlet manifold openings 112 are aligned with the air outlet manifolds 36, with the bosses 114 of bottom plate 30 sealing with the bosses 54' of the air outlet manifold openings 52' of the adjacent second core plate 28. Thus, the air outlet manifold openings 112 of the bottom plate 30 provide the air outlet manifolds 36 with an open bottom through which the cooled air exits the heat exchanger 10 through the central opening 14 of base plate 12.

Some or all of the air flow passages 72 and coolant flow passages 74 in core 24 may be provided with a turbulence-enhancing insert 71 such as a turbulizer or a corrugated fin, which may be secured to core plates 26, 28, 30, 32 by brazing. As used herein, the terms "corrugated fin" and "turbulizer" are intended to refer to corrugated turbulence-enhancing inserts having a plurality of axially-extending ridges or crests connected by side walls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and example of such turbulizers are described in U.S. Pat. No. Re. 35,890 (So) and U.S. Pat. No. 6,273,183 (So et al.). The patents to So and So et al. are incorporated herein by reference in their entireties.

Figure 8A:
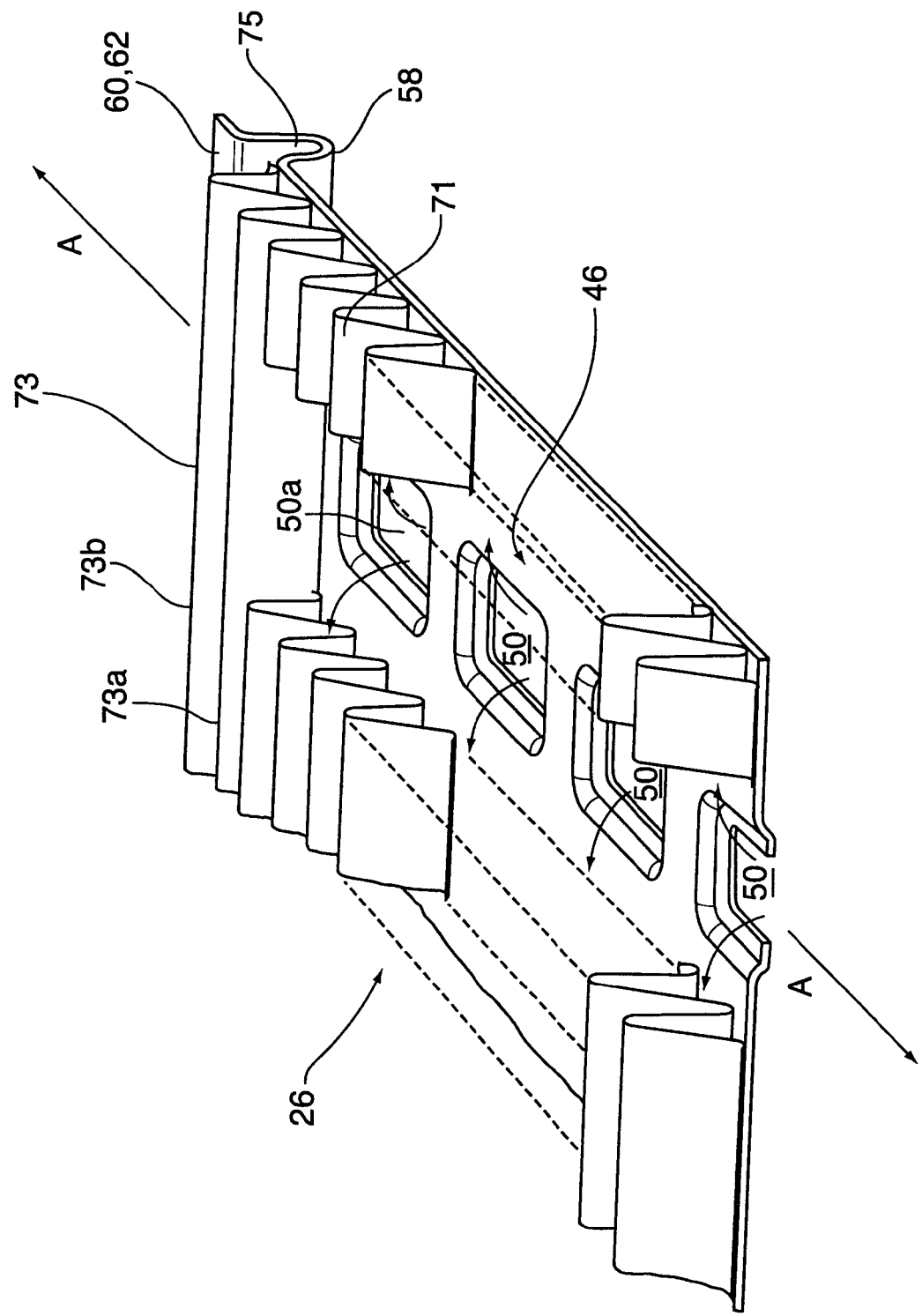
FIG. 8a is an enlarged cross-section through the plate of FIG. 8, along lines 8a-8a' and 8a"-8a'" of FIG. 8.

The outline of an air-side turbulence-enhancing insert 71 is shown in dotted lines in FIG. 8, and is shown in more detail in FIG. 8a. Where the insert 71 is a corrugated fin as shown in FIG. 8a, it will be arranged so that the openings defined by the ridges and crests are at 90 degrees to axis A, thereby guiding the air flow from air manifold inlet openings 50 toward the air manifold outlet openings 52, while blocking air flow parallel to axis A. This is indicated by the curved arrows extending out from openings 50 in FIG. 8a. Where the insert 71 is a turbulizer or offset strip fin, or where the insert is a fin having openings or louvers in its side walls, the openings defined by the ridges and crests are also at 90 degrees to axis A, and define a low pressure drop direction, whereas openings defined in the walls of the turbulizer or fin are oriented along axis A, and define a high pressure drop direction. This orientation also guides flow from the air inlet manifold openings 50 toward the air manifold outlet openings 52. For convenience, only a portion of insert 71 is shown in FIG. 8a. The broken lines joining the sections of insert 71 extending along either side of the row of openings 50 are indicate that the corrugations of insert 71 extend continuously along the row of openings 50.

It can be seen from the drawings that there is a gap between each of the end-most air inlet manifold openings 50 and an outer peripheral edge of the air flow passage 72. Furthermore, a narrow bypass channel 75 is defined along the underside of the rib 58 which forms the coolant side sealing surface on the opposite side 44 of plate 26. Bypass channel 75 is located along the outer peripheral edge of the air flow passage and is in flow communication with both air outlet manifold openings 52 and therefore provides a bypass for air flow between the air inlet manifold 34 and the air outlet manifolds 36.

In some embodiments of the invention, direct communication between the end-most air inlet manifold opening 50 and channel 75 at one or both ends of the plates, 26, 28 can be blocked by inserting a blocking element into the air flow passage 72 between one of the end-most openings 50 and the channel 75. Each blocking element extends along an edge of one of the end-most openings 50 of the air inlet manifold 34 and blocks bypass flow between the opening 50 and the bypass channel 75. In the embodiments shown in the drawings, the blocking elements are generally transverse to the longitudinal axis A.

Figure 8B:
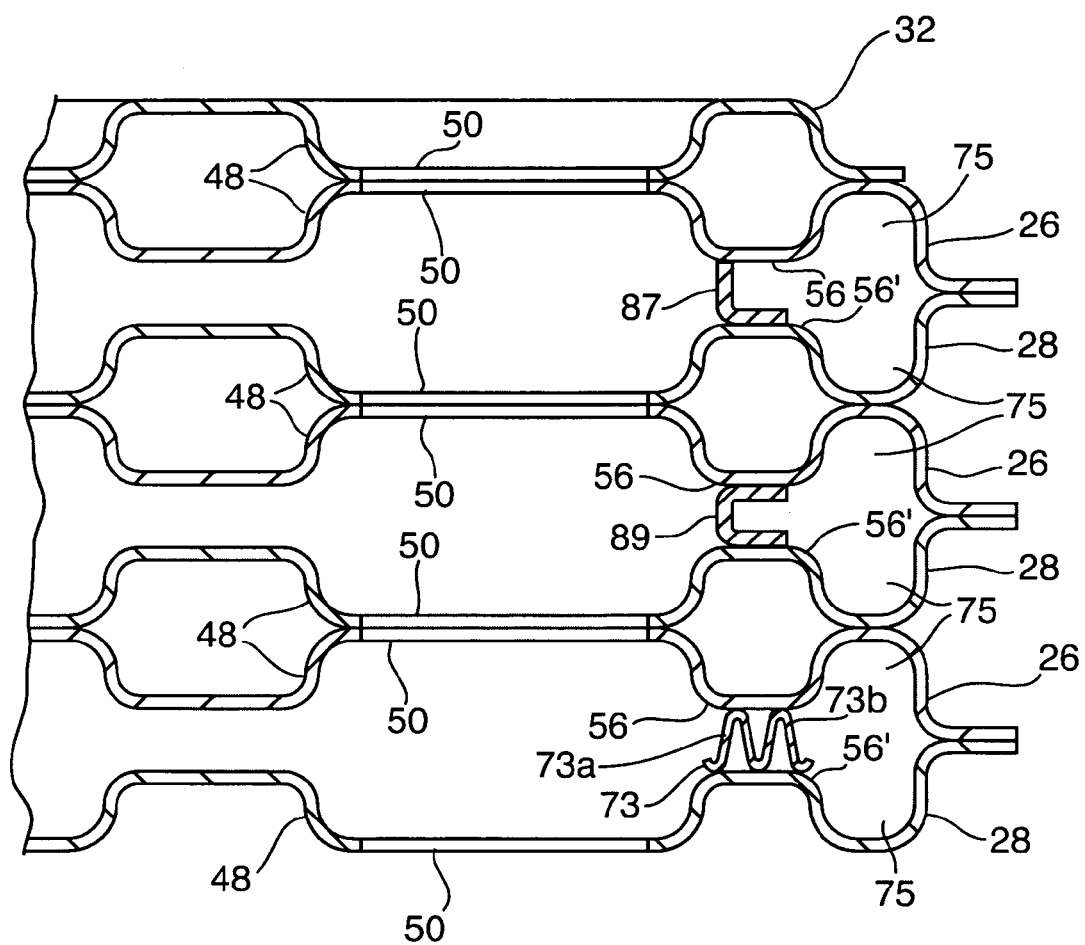
FIG. 8b is a close-up of a portion of the longitudinal cross-section of FIG. 6, showing a number of blocking elements.

For example, as shown in FIG. 8b, the blocking element may comprise an elongate member having an L-shaped cross-section 87 or an elongate member having a C-shaped cross section 89. The L-shaped member 87 has one leg laying flat against the base 56 of plate 26 or the base 56' of plate 28, and the other leg extending between the planar base 56 of plate 26 and the planar base 56' of the mating core plate 28. Similarly, the C-shaped member 89 has one leg flat against the planar base 56 of plate 26 and the other leg flat against the planar base 56' of plate 28, with a middle portion extending between the planar base 56 of plate 26 and the planar base 56' of the mating core plate 28.

In some embodiments of the invention, the blocking element may be incorporated into the turbulence-enhancing insert. For example, the insert 71 may include end portions 73 including at least one transversely extending ridge and/or crest which prevents or minimizes flow communication between the end-most air inlet manifold openings 50 and For example, where the insert 71 is a corrugated fin having side walls without perforations, as shown in FIG. 8a, the end portion 73 of insert 71 merely comprises one or more corrugations which extend transversely across the space separating channel 75 from end-most inlet manifold opening 50 (labeled as 50a in FIG. 8a). In FIGS. 8a and 8b the end portion consists of two such corrugations, labeled as 73a and 73b. Where the insert is a turbulizer or offset strip, or a corrugated fin with louvers or openings in its side walls, the openings in the side walls of the corrugations making up end portion 73 will be closed, blocked or covered so as to prevent bypass flow between the end-most inlet manifold opening 50a and channel 75. This can be accomplished by deforming or crimping the corrugations making up end portion 73, or by covering or replacing the perforated corrugations with a piece of an insert 71 having corrugations with unperforated side walls. A layer of fin or turbulizer 71 may also be provided on the bottom of core 24, within the outlet air distribution space 76, in order to improve heat transfer and to improve uniformity of outlet air flow.

Figure 9A:
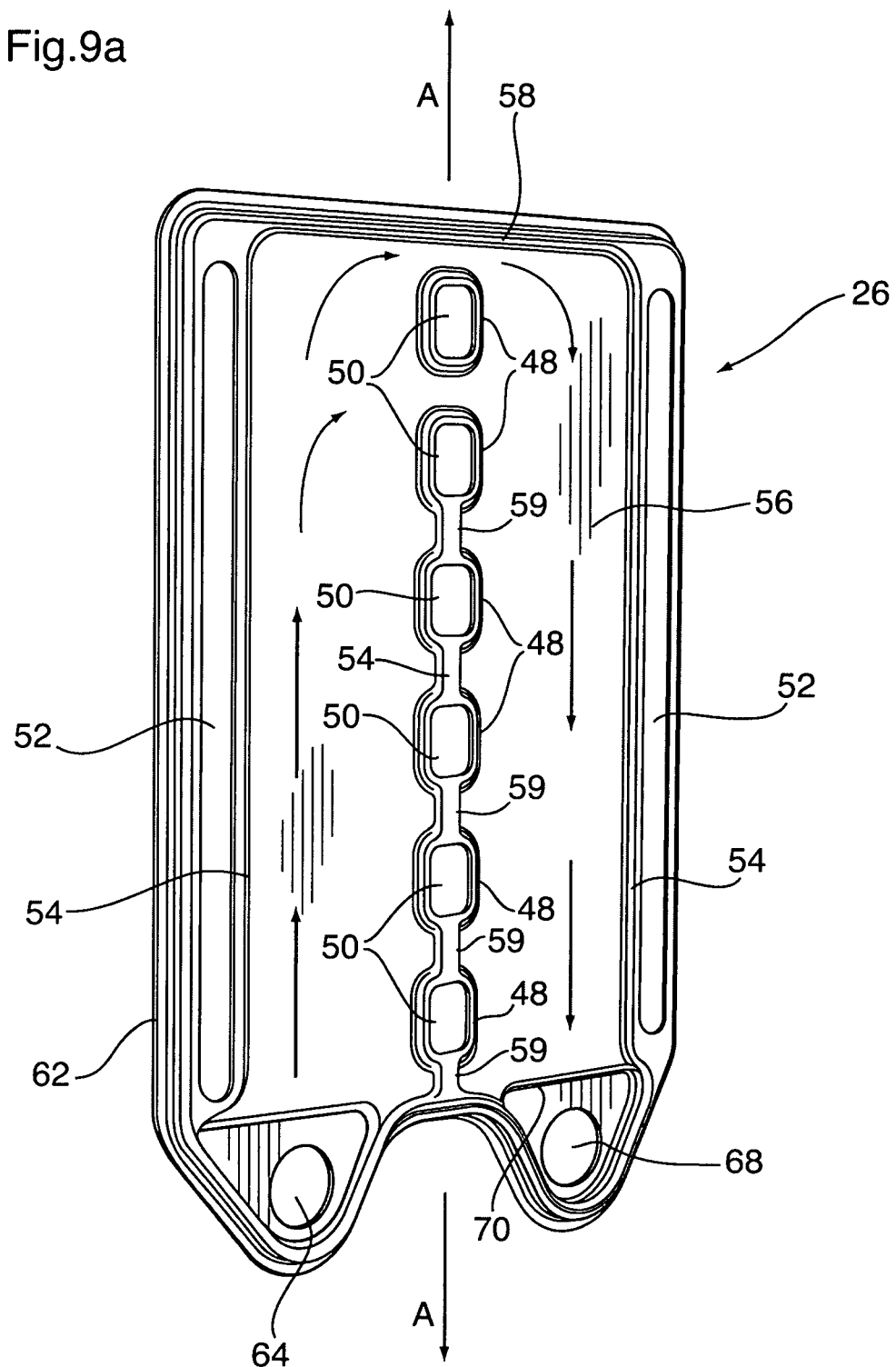
FIG. 9a is a perspective view of the coolant side of a first core plate having configured for U-shaped flow of coolant.
Figure 10:
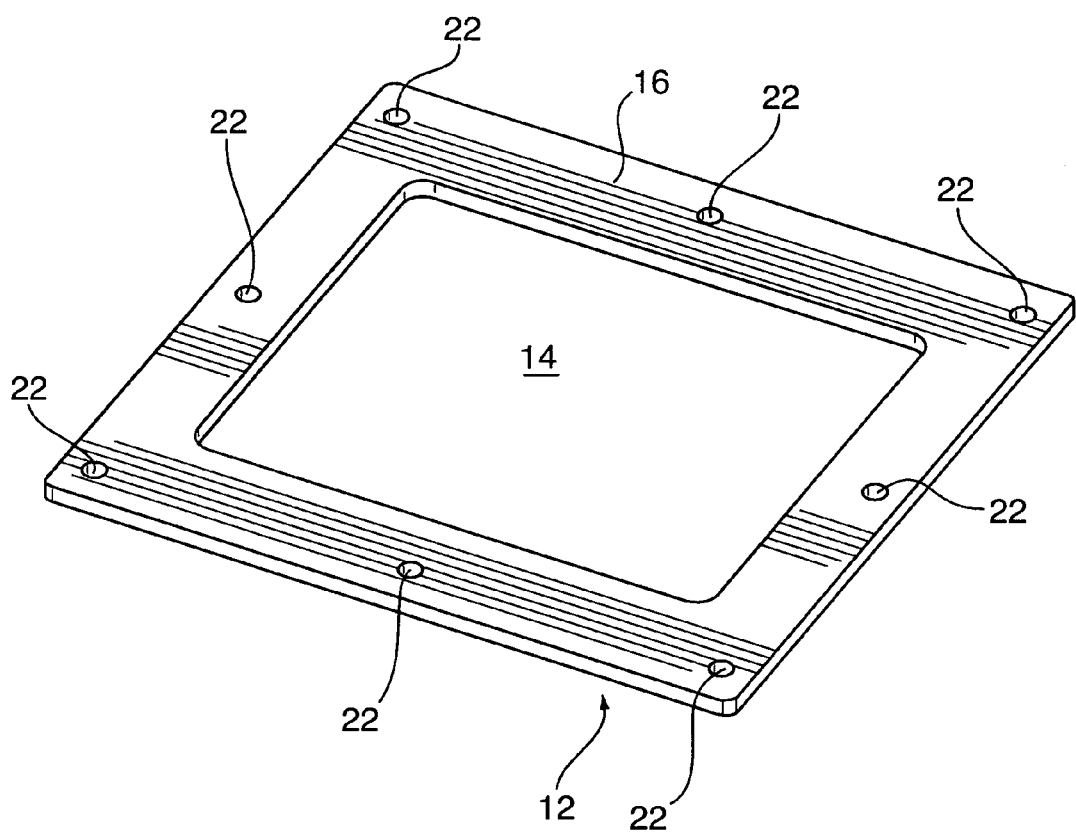
FIG. 10 is a top perspective view of the base plate of the heat exchanger according to the first embodiment.
Figure 11:
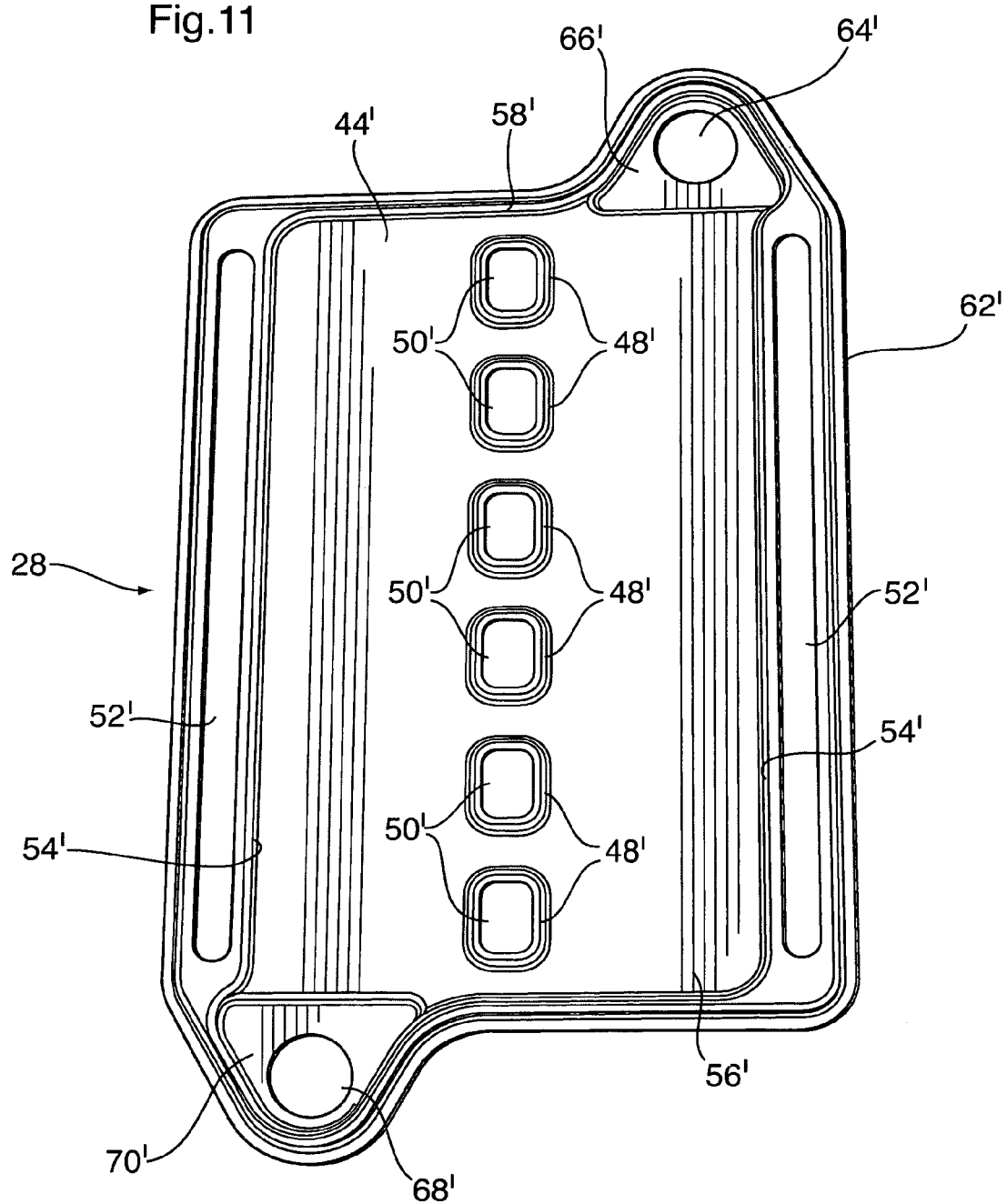
FIG. 11 is a perspective view of the coolant side of the second core plate.
Figure 12:
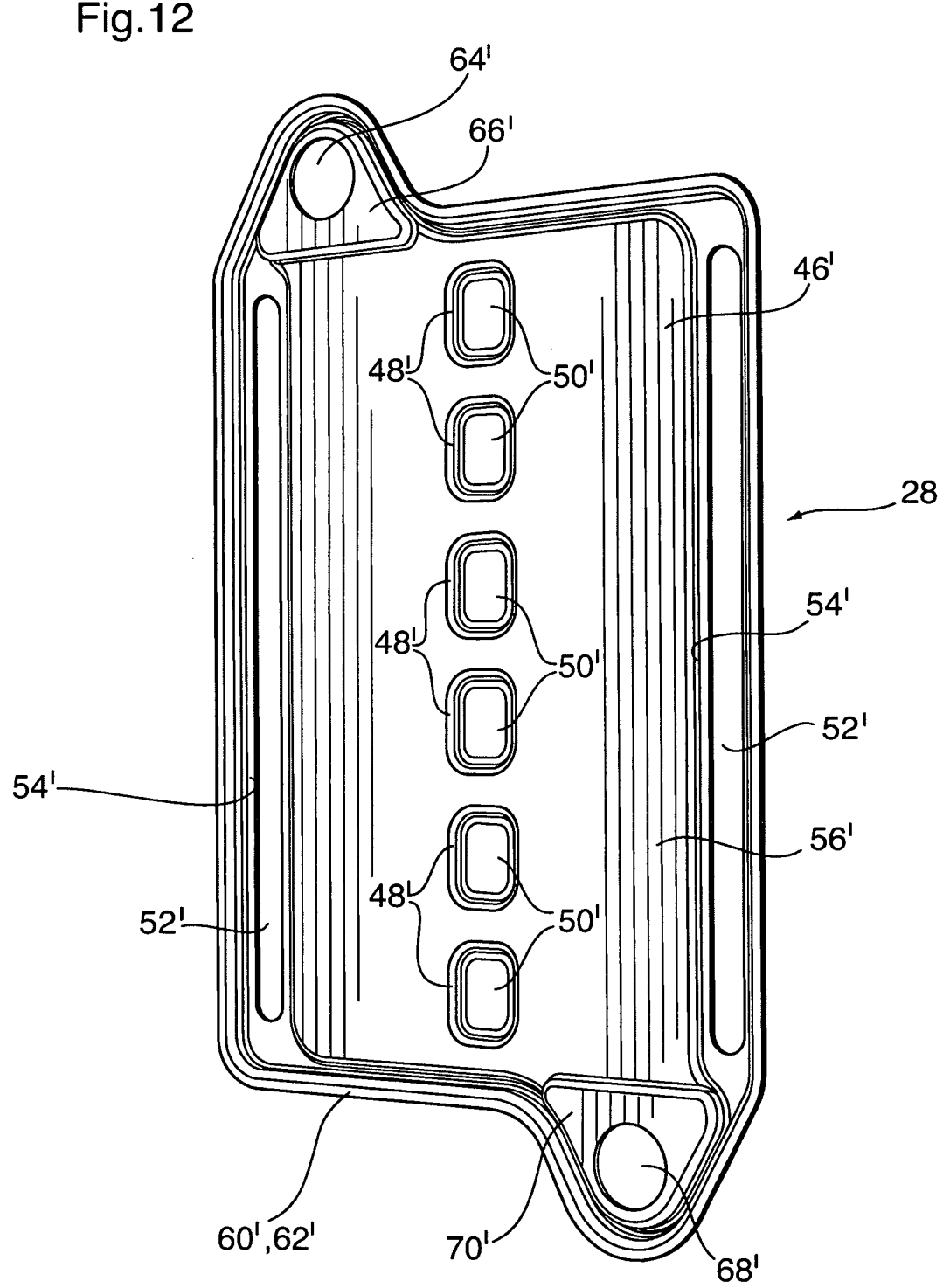
FIG. 12 is a perspective view of the air side of the second core plate.

As mentioned above, the core plates 26, 28 can be configured with both coolant manifolds 38, 40 located along the same side or end of each plate, so that the coolant flow passage 74 will have a U-flow configuration. FIG. 9a shows the coolant side of a core plate 26', which is identical to core plate 26 described above, with the exception that it is configured with a two-pass, U-shaped coolant flow passage. As shown in FIG. 9a, coolant inlet manifold opening 64 and coolant outlet manifold opening 68 are both located along one of the narrower sides of plate 26' so that the predominant directions of coolant flow will be parallel to axis A. In addition, axial ribs 59 are provided between adjacent bosses 48 and between the boss 48 and the peripheral rib 58 at the end of plate 26' at which the coolant manifold openings 64, 68 are located. At the opposite end of plate 26' a gap is left between the end boss 48 and the peripheral rib 58 so as to permit cross-over flow. Also, the rib 59 may be omitted between at least one pair of bosses 48 so as to maximize distribution of flow across the surface of plate 26'. For example, in the embodiment shown in FIG. 9a, there is no rib 59 between the last two bosses 48 adjacent to the end opposite to the openings 64, 68 so as to promote distributed flow across the plate 26'.

It will be appreciated that the rib 59 closest to openings 64, 68 in FIG. 9a may form a corresponding channel in the opposite (air) side of plate 26, and this channel may permit bypass flow of air between the end-most opening 50 and the peripheral edge of plate, i.e. as described above with reference to channel 75 of FIG. 8a. To avoid such bypass flow the rib 59 closest to opening 64, 68 may be a "blind rib", meaning that it is filled, covered, or otherwise closed on the air side of plate 26.

Having now described the structure of heat exchanger 10, the following is a description of its operation.

The heat exchanger 10 may be used as a charge air cooler for transferring heat from a hot intake air stream to a gaseous or liquid coolant, typically a liquid coolant such as a glycol/water engine coolant. The coolant enters heat exchanger 10 through the coolant inlet manifold opening 82 of top plate 32 and flows into the coolant inlet manifold 38, which extends throughout the height of the core 24, and is closed by bottom plate 30. The coolant flows from the coolant inlet manifold 38 into each of the coolant flow passages 74, and then flows diagonally and longitudinally through the coolant flow passages 74 toward the coolant outlet manifold 40 located at the diagonally opposite corner of the core 24. After flowing from the coolant flow passages 74 into the coolant outlet manifold 40, the coolant flows out of the heat exchanger through the coolant outlet manifold opening 84 of the top plate 32.

The hot charge air enters the air inlet manifold 34 through the air inlet manifold openings 86 provided in top plate 32. Since the air inlet manifold 34 extends along substantially along the entire length of core 24, the flow of the incoming charge air is distributed along axis A throughout substantially the entire length of core 24. The coolant inlet manifold 38 is in flow communication with each of the air flow passages 72 in the core 24, and therefore the air flows from the coolant inlet manifold 38 into the plurality of air flow passages 72. The air flows through the air flow passages 72 from the air inlet manifold 34 toward the pair of air outlet manifolds 36 located along the longitudinal edges of the core 24. Therefore, the flow of the air entering the air inlet manifold 34 is split into two separate streams, one flowing toward a first one of the air outlet manifolds 36 and the other part flowing in the opposite direction toward the other air outlet manifold 36. Therefore, the flow of the air is split and flows in a substantial cross-flow configuration relative to the coolant flow, transversely across the core 24. The air outlet manifolds 36 are closed by the top plate 32 and are open at the bottom through bottom plate 30. Therefore, the air enters the air outlet manifolds 36 and flows downwardly toward the bottom of core 24, exiting the core through the air outlet manifold openings 112 provided in the bottom plate 30. The cooled air exiting the peripherally located air outlet manifolds 36 then enters the outlet air distribution space 76 provided between the bottom plate 30 and the bottom surface 18 of base plate 12. The perforated base plate 42 ensures that the flow of air from the air outlet manifolds 36 is combined and made more uniform as it exits from the bottom of heat exchanger 10.

In terms of manufacturability, the plates making up heat exchanger 10, as well as any turbulence-enhancing inserts, may be constructed from brazeable materials such as aluminum alloys. During the manufacturing process, the components of heat exchanger 10 are assembled and fixtured to hold the components in place, and are then passed through a brazing oven where the components are heated and brazed together, for example in a single operation. The fixture clamps the components together, typically applying clamping force in a single direction, to ensure good contact for brazing, which is necessary for the plates to seal together reliably. The structure of heat exchanger 10 is particularly well suited to being brazed in a single brazing operation with clamping pressure applied in a single direction, i.e. through the height of stack (eg. in the vertical direction in the side view of FIG. 3. The horizontal arrangement of the hot gas and coolant flow paths and the manifold openings in core 24 further permits the core 24 to be brought into intimate contact with both the base plate 12 and coolant inlet duct 17 during brazing, thereby ensuring a good seal and strong braze joint. Therefore, the structure of heat exchanger 10 is advantageous in terms of manufacturability, for example as compared to designs where the plates are oriented vertically, i.e. parallel to the vertical direction in FIG. 3. Although a "vertical plate" construction is simpler in that it eliminates the need for split flow and for mixing of the outlet gases, it is considerably more difficult to manufacture in that it requires the application of clamping pressure in more than one direction, and results in difficulties in mating the core to the base plate. Also, in the vertical plate orientation, the gases exiting each of the air flow passages 72 flows directly out through the bottom of the heat exchanger, and there may be insufficient mixing of the gas flows from the individual air flow passages 72. Thus, a heat exchanger having a vertical plate orientation is subject to the disadvantage discussed above, whereby non-uniformity in the temperature of the outlet air flow results in the creation of hot spots in the component immediately downstream of the heat exchanger.

The split flow orientation of heat exchanger 10 produces an additional benefit where, as in heat exchanger 10, the core 24 has a self-enclosed structure with core plates joined together in face-to-face arrangement with one another. As mentioned above, the core plates 26, 28 are joined to adjacent core plates in the stack along flanges 62 and ribs 58. As explained above, at each end of a plate 26, 28, the underside of rib 58 forms a channel 75 which connects the two outlet manifolds 36. However, as both outlet manifolds 36 are at the same pressure, there will be minimal air flow through this channel 75. In most typical self-enclosed heat exchangers, excluding dished plate designs, the air inlets and outlets are connected by a channel which is defined by the peripheral sealing rib. Due to the pressure differential between the inlet and outlet there is typically a significant amount of bypass flow through these channels. In the split flow design, however, there is no such channel connecting the inlet and outlet openings.

Figure 15:
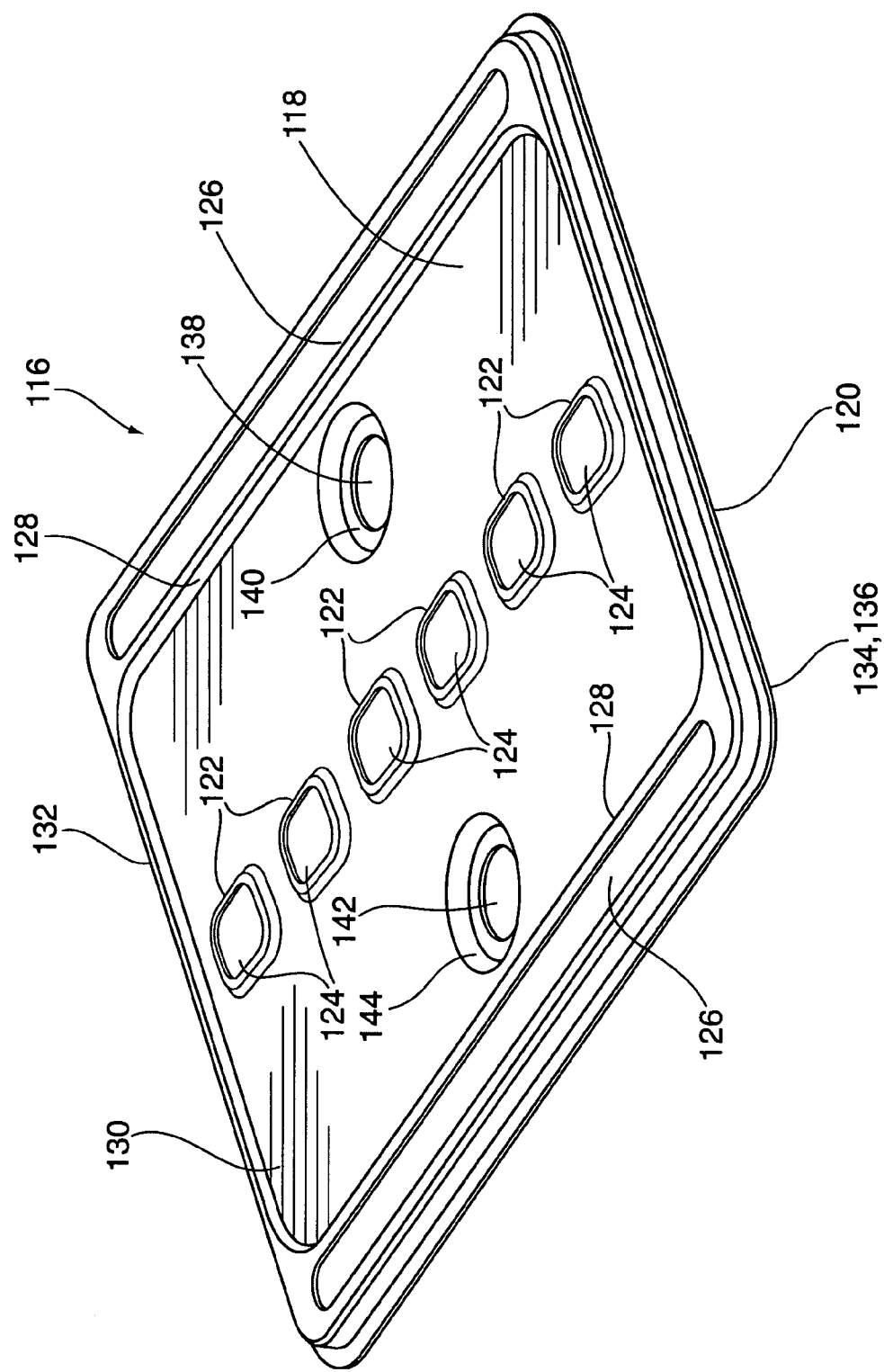
FIG. 15 is a top perspective view of a core plate of a heat exchanger according to a second embodiment.

FIG. 15 illustrates a core plate 116 which can be used to construct a heat exchanger according to a second embodiment of the invention. The core plate 116 is analogous to core plates 26, 28 described above, except that core plate 116 is identical to its mirror image, meaning that only one type of core plate 116 is needed to form the core, excepting the top and bottom plates.

Core plate 116 has a planar base 130 with a coolant side 118, facing up in FIG. 15, and an opposite air side 120, which is not visible in FIG. 15. A plurality of bosses 122 upstanding on the coolant side 118 of plate 116 are located along the central longitudinal axis A thereof. Each of the bosses 122 has a flat top surface provided with an air inlet manifold opening 124. Transversely spaced toward the peripheral edges of plate 116 are two bosses 128, also upstanding on the coolant side 118. The bosses 128 each have a flat top surface provided with an air outlet manifold opening 126. The bosses 122, 128 in which the openings 50, 52 are formed are co-planar with a coolant side sealing surface 132 in the form of a peripheral ridge, for sealing to bosses 122, 128 in an adjacent plate 116. On the air side 120 a sealing surface 134 is provided, wherein the sealing surface 134 is located on an outwardly extending peripheral flange 136.

The air flow path through the heat exchanger of the second embodiment is exactly the same as that of the heat exchanger 10. As can be seen from FIG. 15, air flows through an air inlet manifold defined by aligned inlet openings 124, and is split into two opposite directions as it enters the air flow passages defined between the air sides 120 of adjacent plates 116. The air flows transversely from the center of plate 116 toward a pair of air outlet manifolds, each of which is defined by aligned openings 126. The air outlet manifold is open on the bottom of the heat exchanger and closed on the top by a top plate, as in the first embodiment.

The coolant flows between a coolant inlet manifold opening 138 and a coolant outlet manifold opening 142. The coolant inlet and outlet manifold openings 138, 142 are formed in the flat top surfaces of bosses 140, 144 upstanding on the air side 120, and are co-planar with the air side sealing surface 134, so as to enable sealing with bosses 140, 144 on the air side 120 of an adjacent core plate 116. The coolant manifold openings 138, 142 are located on opposite sides of the axis A, toward the axially-extending sides of core plate 116. Thus, the direction of coolant flow across the coolant side 118 of core plate 116 is transverse to axis A, in partial co-flow and partial counter-flow orientation relative to the directions in which the air flows. The coolant inlet and outlet manifolds are open at the top of the heat exchanger, and the bottoms of the coolant inlet and outlet manifolds are closed by a bottom plate, as in the first embodiment.

Since the core plate 116 includes air inlet and outlet manifold openings 124, 126 and coolant inlet and outlet manifold openings 138, 142, it will be appreciated that a core comprised of a stack of core plates 116 will be self-enclosed and, like the heat exchanger 10 according to the first embodiment, does not require an external housing. In addition to core plates 116, the core of the heat exchanger will comprise a top plate provided with a pair of coolant fittings (assuming that the coolant enters and exits through the top plate) and an air inlet fitting; and a bottom plate provided with a pair of openings which are aligned with the air inlet and outlet manifolds. The core will be mounted on a base plate and a perforated plate may be provided to improve the uniformity of the flow exiting the heat exchanger through the base plate. The other details of the heat exchanger according to the second embodiment are the same as heat exchanger 10, and are not discussed in detail herein.

Figure 16:
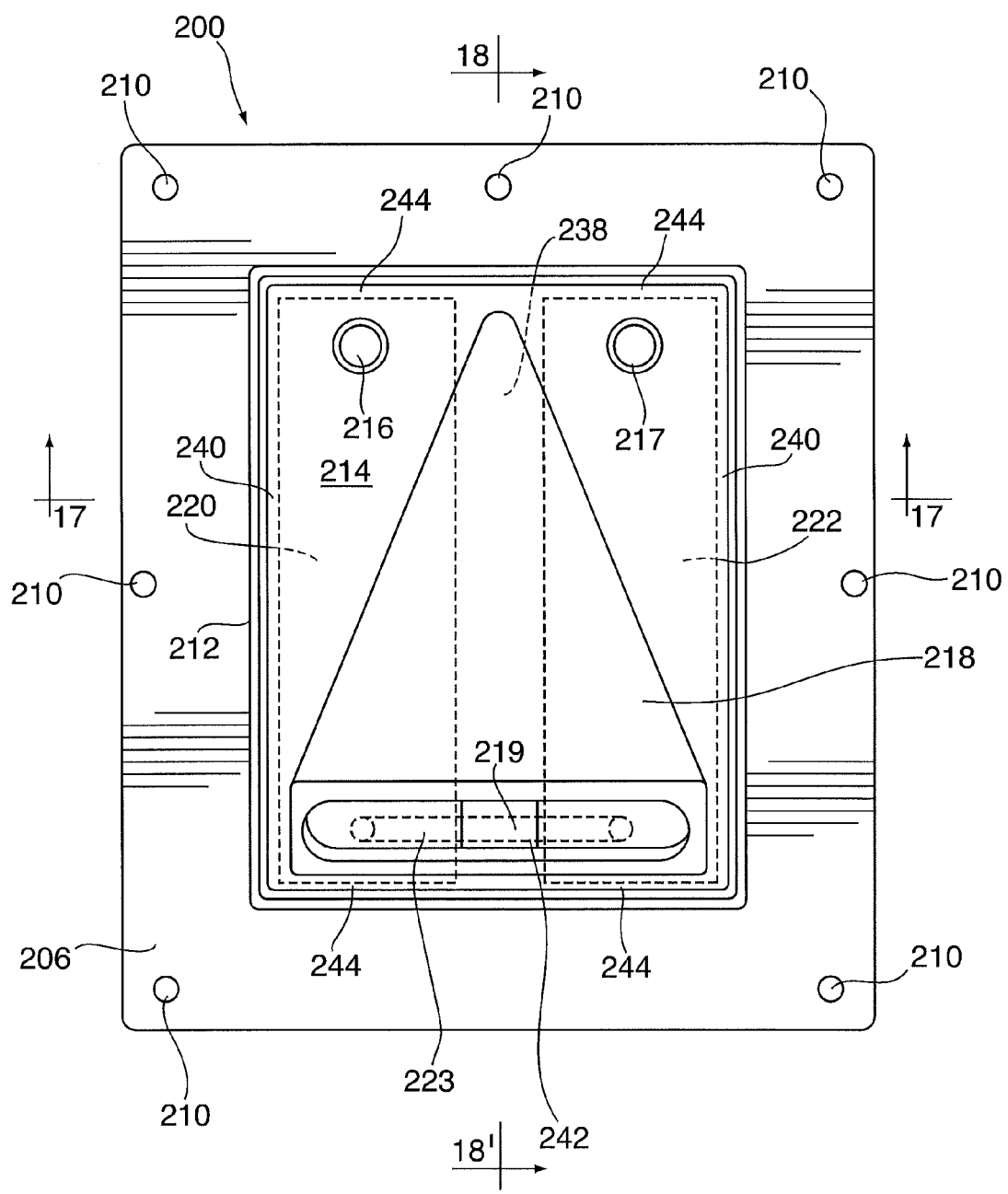
FIG. 16 is a top plan view of a heat exchanger according to a third embodiment.
Figure 17:
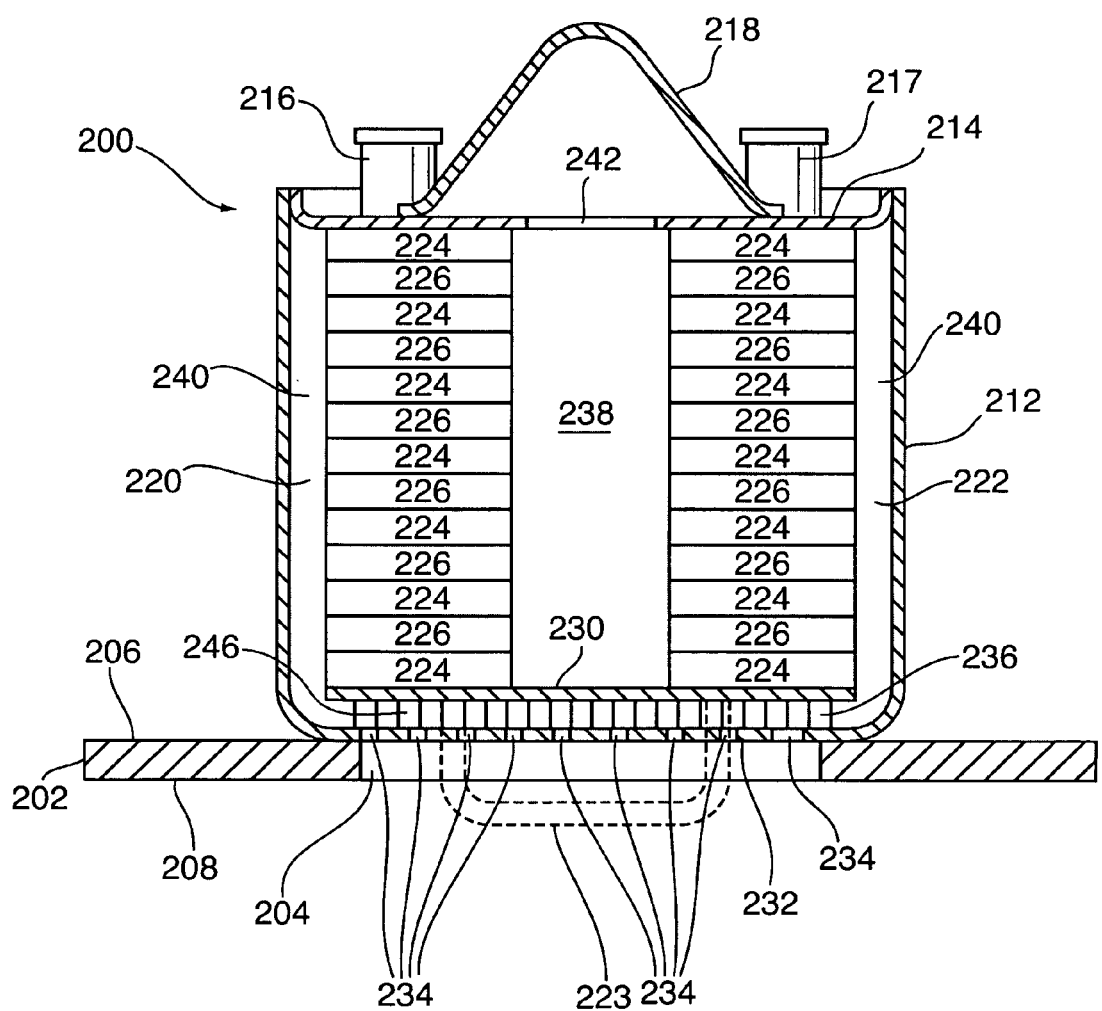
FIG. 17 is a transverse cross-section along line 17-17 of FIG. 16.
Figure 18:
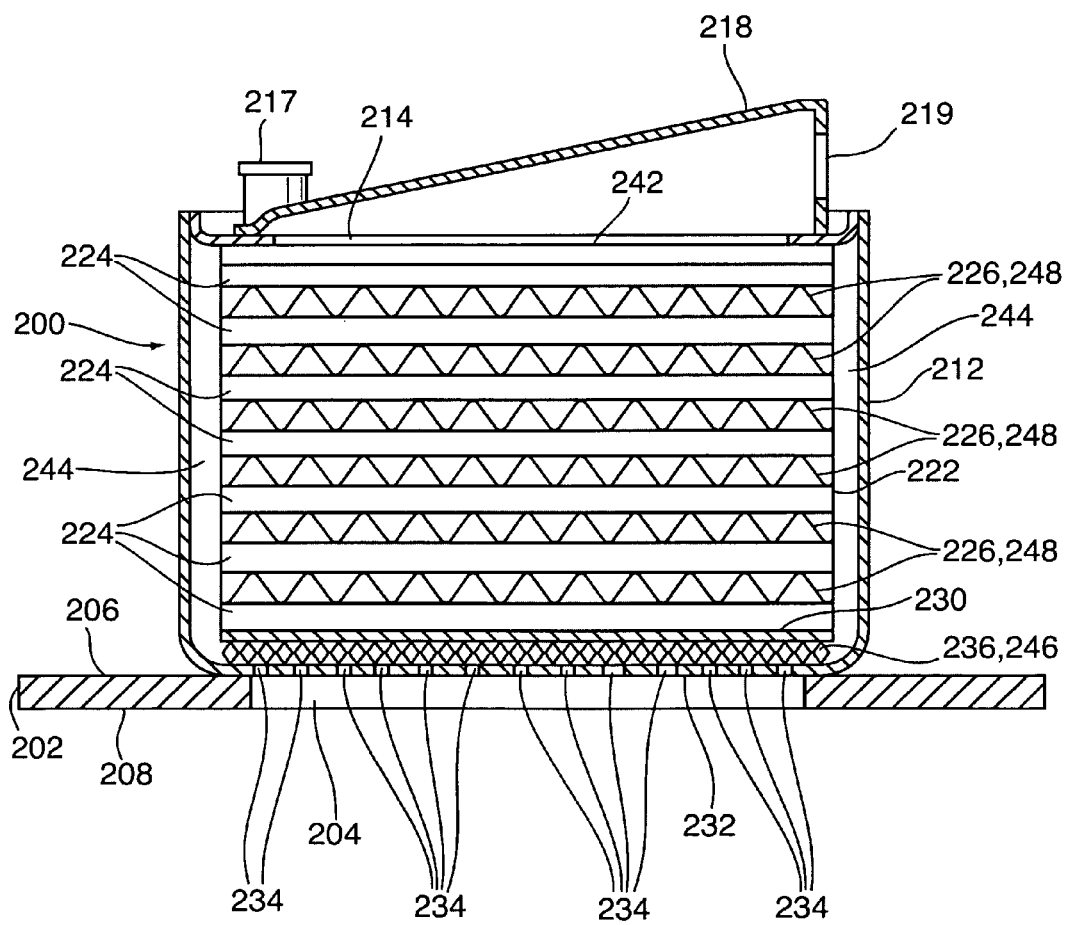
FIG. 18 is a longitudinal cross-section along line 18-18' of FIG. 16.

A heat exchanger 200 according to a third embodiment of the invention is schematically illustrated in FIGS. 16 to 18. Like the heat exchangers according to the first and second embodiments, heat exchanger 200 has a split core which splits the incoming air flow in two directions, and then redistributes the split air flow discharged from the heat exchanger core to provide uniform air flow at the outlet. However, unlike the self-enclosed heat exchangers according to the first and second embodiments, the split core of heat exchanger 200 is completely split into two portions 220, 222 which are enclosed in an external housing 212 with a top plate 214. Because heat exchanger 200 includes a housing 212, the construction of cores 220, 222 can be made simpler than in the first two embodiments. For example, the cores 220, 222 may each comprise a plurality of flat tubes defining the coolant flow passages 224, the tubes being separated by layers of corrugated fins which define the air flow passages 226. In the drawings of heat exchanger 200 the cores 220, 222 are shown schematically, with structural details being omitted for clarity. Furthermore, although top plate 214 of housing 212 is shown as being provided with a pair of coolant fittings 216, 217, it will be appreciated that the locations of the coolant fittings is variable, and that top plate may be provided with two pairs of coolant fittings, a first pair for core 220 and a second pair for core 222. Alternatively, the coolant fitting 216 may serve as an inlet fitting for the pair of cores 220, 222 and the coolant fitting 217 may serve as an outlet fitting for the pair of cores 220, 222. In this alternate configuration, a U-shaped tube 223 may be provided to join the cores 220, 222 together. For example, as shown in dotted lines in FIGS. 16 and 17, the U-tube 223 may be located on the underside of cores 220, 222, inside the outlet chamber 246. In this alternate configuration, the coolant will flow along an overall U-shaped path between inlet fitting 216 and outlet fitting 217.

Heat exchanger 200 includes a base plate 202 with a central opening 204. The base plate 202 has a top surface 206 on which the housing 212 is mounted, and an opposite bottom surface 208. The housing 212 has a perforated bottom 232 provided with a plurality of holes 234 which permit the air to be discharged from housing 212 and exit heat exchanger 200 through the central opening 204 of base plate 202. The perforated bottom 232 of housing 212 serves the same purpose as the perforated plate 42 of heat exchanger 10, i.e. to make the outlet flow of the air more uniform across the area of central opening 204 of base plate 202.

The top plate 214 is sealed to housing 212 about its edges. In addition to coolant fittings 216, 217, the top plate 214 is provided with an air inlet fitting 218 which receives charge air and directs it into an air inlet manifold 238 which comprises an open space between the cores 220, 222, the manifold 238 extending longitudinally, parallel to axis A, along the entire length and height of cores 220, 222. The air inlet manifold 238 therefore distributes the charge air across the entire length and height of cores 220, 222, and is in flow communication with all of the air flow passages 226. The air inlet manifold 238 is in flow communication with the air inlet fitting 218 through a longitudinally extending slot 242 provided in the top plate 214 of housing 212.

The air inlet fitting 218 may be shaped as a scoop or horn, having a relatively wide mouth with an intake opening 219 and being reduced in width toward its rear end, or the inlet fitting 218 may have a relatively constant cross-sectional area throughout its length. In any event, the air inlet fitting has a length and width sufficient to completely cover the slot 242 in top plate 214, thereby directing the charge air into the air inlet manifold 238.

Like the first two embodiments described above, heat exchanger 200 includes a pair of longitudinally extending air outlet manifolds 240 located along the outer peripheral edges of the core. In the present embodiment, each of the air outlet manifolds 240 comprises a space between a longitudinal face of a core 220 or 222 and a sidewall of housing 212. Each of the air outlet manifolds 240 extend along the entire length and height of one of the cores 220 or 222, and is in flow communication with all of the air flow passages 226 of that core 220 or 222. Because the cores 220, 222 are directly connected to the underside of top plate 214, bypass flow between the inlet and outlet manifolds over the tops of cores 220, 222 is prevented. Although FIG. 18 shows gaps 244 at the ends of cores 220, 222, it will be appreciated that the heat exchanger 200 may be provided with baffles or other means for blocking or sealing this gap so as to minimize bypass flow around the ends of the cores 220, 222.

The air outlet manifolds 240 are left open, so that the flow of air will be directed downwardly from air outlet manifolds 240 and around the bottoms of cores 220, 222 into an outlet air distribution space or outlet chamber 246. The outlet chamber 246 is defined within a space between the perforated bottom wall 232 of housing 212 and a bottom plate 230 on which both cores 220, 222 are mounted. The bottom plate 230 covers the entire area of the two cores 220, 222 and the air inlet manifold 238, and thereby prevents flow communication between the air inlet manifold 238 and the outlet chamber 246. Once the air flow enters outlet chamber 246 it is redistributed and flows out through holes 234 in the perforated bottom wall 232, finally exiting the heat exchanger 200 through the central opening 204 of base plate 202.

The outlet chamber 246 may be provided with one or more layers of a turbulence-enhancing insert as described above. For example, chamber 246 is shown in the drawings as being provided with a turbulizer 236 in the form of an offset strip fin which is arranged with the openings of its convolutions facing transversely, as shown in FIG. 18. This is referred to as the low pressure drop orientation. The turbulizer 236 serves both to enhance heat transfer between the air and coolant, and also to act as a spacer between the bottom plate 230 and the perforated bottom wall 232 of housing 212. The holes 234 in bottom wall 232 are preferably arranged such that they are not blocked by the bottom lands (i.e. bottom surfaces) of the convolutions of turbulizer 236.

The air flow passages 226 may be provided with simple corrugated fins 248 with the openings of the convolutions facing transversely, as shown in FIG. 18.

Although the invention has been described in connection with certain embodiments, it is not limited thereto. Rather, the invention includes all embodiments which may fall within the scope of the following claims.

What is claimed is:

1. A heat exchanger for cooling a gas with a coolant, the heat exchanger comprising:
    a heat exchanger core having a central longitudinal axis, with a length defined along said central longitudinal axis, the heat exchanger core having a top and a bottom, and comprising a plurality of core plates joined together in a stack and defining a plurality of first gas flow passages and a plurality of first coolant flow passages, wherein the first gas flow passages and the first coolant flow passages are arranged in alternating order throughout the heat exchanger core, and wherein the core plates, the coolant flow passages and the gas flow passages extend along the length of the heat exchanger core, parallel to the central longitudinal axis;
    a top plate located at the top of the heat exchanger core and extending along the length of the heat exchanger core, parallel to the central longitudinal axis;
    a bottom plate located at the bottom of the heat exchanger core and extending along the length of the heat exchanger core, parallel to the central longitudinal axis;
    a first gas outlet manifold and a second gas outlet manifold, at least one of which is in flow communication with the gas flow passages of the heat exchanger core, each of the outlet manifolds having a bottom which is open through an opening in the bottom plate and a top which is closed by the top plate;
    a gas inlet manifold in flow communication with both the first and second gas outlet manifolds and being located upstream of the first and second gas outlet manifolds, the gas inlet manifold having a top which is open through one or more openings in the top plate, and the gas inlet manifold having a bottom which is closed by the bottom plate; and
    a gas outlet chamber in flow communication with both the first and second gas outlet manifolds and being located downstream of the first and second gas outlet manifolds;
    a gas outlet for discharging the gas from the heat exchanger;
    wherein the gas inlet manifold is located between the first gas outlet manifold and the second gas outlet manifold, such that a first gas flow direction between the gas inlet manifold and the first gas outlet manifold differs from a second gas flow direction between the gas inlet manifold and the second gas outlet manifold; and
    wherein the gas outlet chamber receives the gas flows from the first and second gas outlet manifolds and provides a space in which the gas flows from the first and second gas outlet manifolds are combined before being discharged from the heat exchanger;
    wherein the gas inlet manifold extends along said central longitudinal axis and extends along substantially the entire length of the heat exchanger core;
    wherein each of the first gas outlet manifold and the second gas outlet manifold is spaced away from said central longitudinal axis toward a generally axially-extending side of the heat exchanger core; and
    wherein the first and second gas outlet manifolds each extend along one of the generally axially-extending sides of the heat exchanger core, and each of the first and second gas outlet manifolds extend along a greater part of the length of the heat exchanger core.

2. The heat exchanger according to claim 1, wherein the first gas flow direction is at an angle of about 180 degrees relative to the second gas flow direction.

3. The heat exchanger according to claim 1, wherein the gas inlet manifold is in flow communication with all of the gas flow passages of the heat exchanger core.

4. The heat exchanger according to claim 1, wherein the inlet manifold and the first and second gas outlet manifolds are contained within the heat exchanger core, such that the heat exchanger core is self-enclosed.

5. The heat exchanger according to claim 1, wherein each of the gas flow passages in the heat exchanger core is in flow communication with the gas inlet manifold and with both the first and second gas outlet manifolds.

6. The heat exchanger according to claim 1, wherein each of the first and second gas outlet manifolds is in flow communication with each of the gas flow passages in the heat exchanger core.

7. The heat exchanger according to claim 1, wherein the gas enters the gas inlet manifold through the top of the heat exchanger core, and the gas exits the first and second gas outlet manifolds through the bottom of the heat exchanger core; wherein the top and the bottom of the heat exchanger core are parallel to the gas flow passages; and wherein the gas outlet chamber is located along the bottom of the heat exchanger core.

8. The heat exchanger according to claim 7, wherein a plate with a plurality of perforations is provided across the gas outlet.

9. The heat exchanger according to claim 8, wherein the perforations are larger at a center of the gas outlet than at an outer edge of the gas outlet.

10. The heat exchanger according to claim 1, wherein the heat exchanger further comprises a base plate for connection to a component which receives the gas from the heat exchanger, wherein the base plate has a top surface to which the heat exchanger core is mounted, and a central opening defining an outlet for the gas which is cooled in the heat exchanger, and wherein each of the gas outlet manifolds is in flow communication with the central opening of the base plate through one said opening of the bottom plate.

11. A heat exchanger for cooling a gas with a coolant, the heat exchanger comprising:
  a heat exchanger core comprising a plurality of first gas flow passages and a plurality of first coolant flow passages, wherein the first gas flow passages and the first coolant flow passages are arranged in alternating order throughout the heat exchanger core;
  a first gas outlet manifold and a second gas outlet manifold, at least one of which is in flow communication with the gas flow passages of the heat exchanger core;
  a gas inlet manifold in flow communication with both the first and second gas outlet manifolds and being located upstream of the first and second gas outlet manifolds; and
  a gas outlet chamber in flow communication with both the first and second gas outlet manifolds and being located downstream of the first and second gas outlet manifolds;
  a gas outlet for discharging the gas from the heat exchanger;
  wherein the gas inlet manifold is located between the first gas outlet manifold and the second gas outlet manifold, such that a first gas flow direction between the gas inlet manifold and the first gas outlet manifold differs from a second gas flow direction between the gas inlet manifold and the second gas outlet manifold; and
  wherein the gas outlet chamber receives the gas flows from the first and second gas outlet manifolds and provides a space in which the gas flows from the first and second gas outlet manifolds are combined before being discharged from the heat exchanger;
  wherein one or more of the gas flow passages or one or more of the coolant flow passages are provided with a turbulence-enhancing insert in the form of a fin or a turbulizer comprising a plurality of corrugations;
  wherein, within said one or more gas flow passages, the corrugations of each insert extend along the gas flow direction between the gas inlet manifold and each of the gas outlet manifolds;
  wherein the corrugations of said insert are interrupted in the vicinity of said gas inlet manifold so that the gas inlet manifold is left uncovered by said insert;
  wherein gaps are provided between opposite ends of said gas inlet manifold and a peripheral edge of said gas flow passage, and wherein said insert includes at least one continuous corrugation extending continuously through each of said gaps, and said at least one continuous corrugation extends between the first gas outlet manifold and the second gas outlet manifold.

12. The heat exchanger according to claim 11, wherein said corrugations include side walls, and wherein the side walls of the continuous corrugations are substantially unperforated, at least in those portions of the continuous corrugations passing through said gaps.

13. The heat exchanger according to claim 1, wherein gaps are provided between opposite ends of said gas inlet manifold and a peripheral edge of said gas flow passage, and wherein a bypass channel is defined along the outer peripheral edge of the gas flow passage, said channel being in flow communication with the first and second gas outlet manifolds; and wherein the heat exchanger further comprises a blocking element provided in each of the gaps between one of the ends of the gas inlet manifold and the bypass channel, the blocking element extending along an edge of the gas inlet manifold and blocking bypass flow between the gas inlet manifold and the bypass channel.

14. The heat exchanger according to claim 1, wherein the coolant flow passages are configured for flow of the coolant along a U-shaped flow path, and the heat exchanger core includes a coolant inlet manifold and a coolant outlet manifold which are both located along one side of the heat exchanger core; and wherein at least one elongate rib is located between the coolant inlet manifold and the coolant outlet manifold, extending along a direction of coolant flow to guide the flow of said coolant along said U-shaped flow path.

15. The heat exchanger according to claim 1, wherein the top plate is provided with a plurality of said openings which are spaced apart along the central longitudinal axis, and wherein the top of the gas inlet manifold is open through said plurality of said openings in the top plate.

16. The heat exchanger according to claim 1, wherein the gas inlet manifold is defined by a single, elongated opening in the heat exchanger core.

* * * * *